United States Patent
Konno et al.

[11] Patent Number: 5,555,129
[45] Date of Patent: Sep. 10, 1996

[54] OPTICAL LOW PASS FILTER

[75] Inventors: Mitsujiro Konno; Katsuya Ono; Yoshiharu Takasugi; Shinya Matsumoto; Kimihiko Nishioka, all of Hachioji, Japan

[73] Assignee: Olympus Optical Co., Ltd., Tokyo, Japan

[21] Appl. No.: 233,742

[22] Filed: Apr. 26, 1994

[30] Foreign Application Priority Data

Apr. 27, 1993 [JP] Japan .................................. 5-122163

[51] Int. Cl.$^6$ ............................. G02B 5/18; H04N 5/225
[52] U.S. Cl. ........................................... 359/569; 348/342
[58] Field of Search ................................. 359/565, 566, 359/568, 569, 571; 385/37; 348/342

[56] References Cited

U.S. PATENT DOCUMENTS

| Re. 20,748 | 6/1938 | Bocca | 359/569 |
|---|---|---|---|
| 3,095,475 | 6/1963 | Brake | 359/566 |
| 3,566,018 | 2/1971 | Macovski | 359/569 |
| 3,667,831 | 6/1972 | Pennington et al. | 359/565 |
| 3,911,479 | 10/1975 | Sakurai . | |
| 4,057,326 | 11/1977 | Knop | 359/568 |
| 4,733,943 | 3/1988 | Suzuki et al. | 359/565 |
| 4,881,805 | 11/1989 | Cohen | 359/565 |
| 4,994,664 | 2/1991 | Veldkamp | 359/565 |
| 4,998,800 | 3/1991 | Nishida et al. . | |
| 5,071,207 | 12/1991 | Ceglio et al. | 359/565 |
| 5,100,226 | 3/1992 | Freeman | 359/565 |
| 5,278,679 | 1/1994 | Davis et al. | 359/569 |

FOREIGN PATENT DOCUMENTS

| 47-18688 | 6/1972 | Japan . |
|---|---|---|
| 63-291026 | 11/1988 | Japan . |
| 4-15669 | 3/1992 | Japan . |

OTHER PUBLICATIONS

Sweat, William C., New Methods of Designing Holographic Optical Elements, SPIE vol. 126 Clever Optics (1977), pp. 46–53.

*Primary Examiner*—Jon W. Henry
*Attorney, Agent, or Firm*—Cushman, Darby & Cushman

[57] ABSTRACT

An optical low pass filter consisting of a diffractive optical element consisting of a plurality of regions which have different imaging characteristics and are joined adjacent to one another so that the imaging characteristics are varied discontinuously. This optical low pass filter is to be used for optical instruments using solid-state image pickup devices and so on.

25 Claims, 25 Drawing Sheets

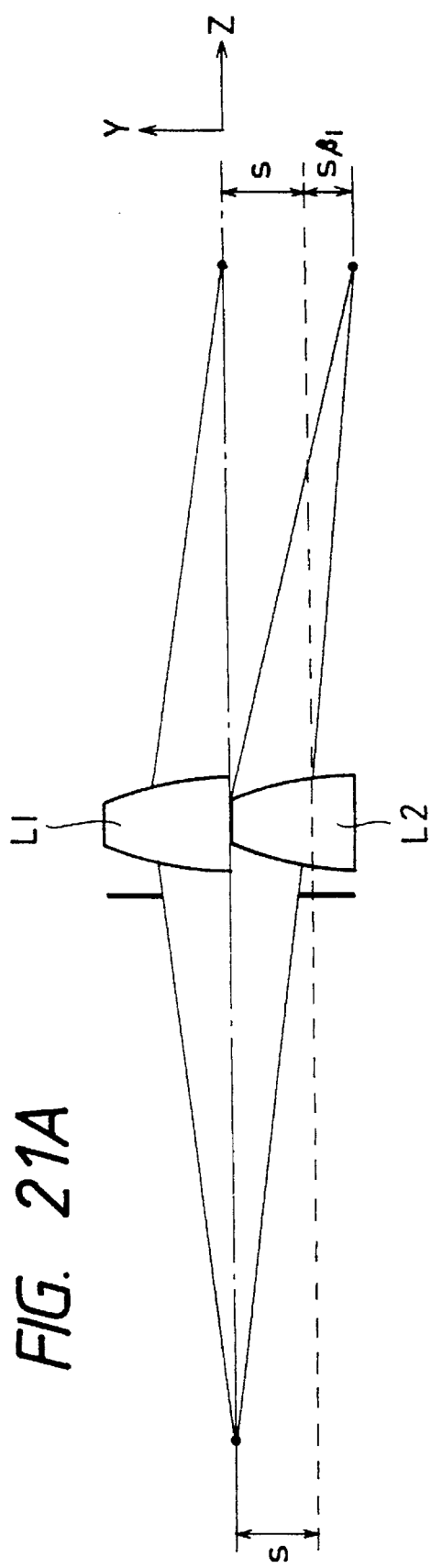
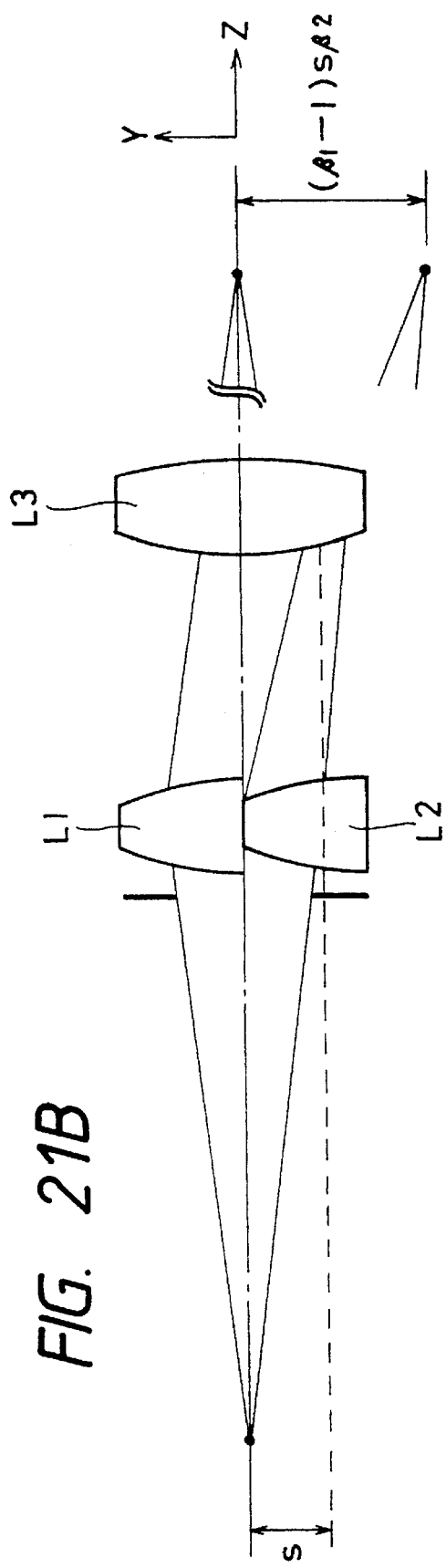
FIG. 21A
FIG. 21B

FIG. 23A  FIG. 23B  FIG. 23C
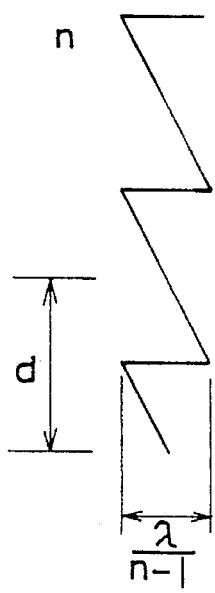
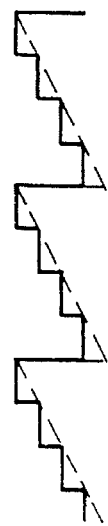
FIG. 24
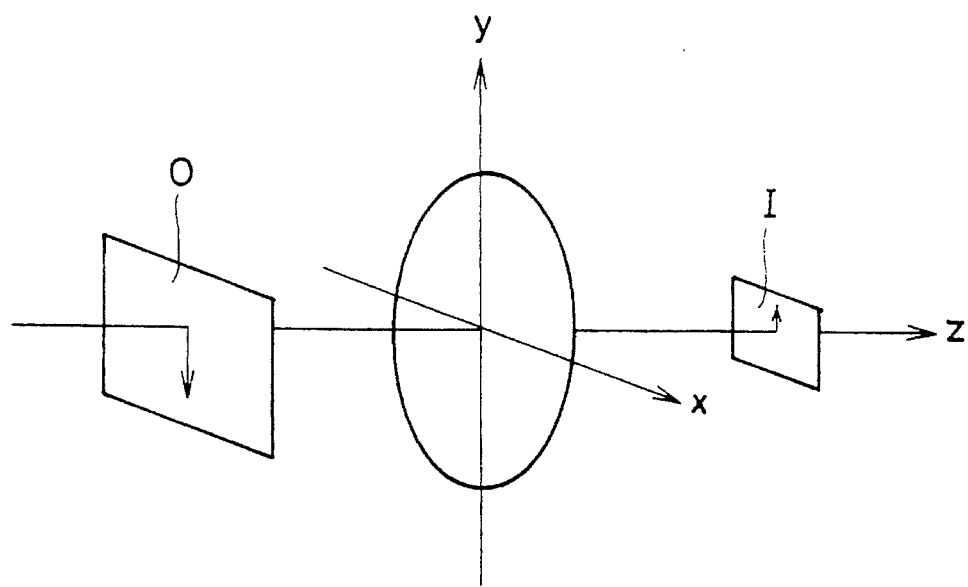

OPTICAL LOW PASS FILTER

BACKGROUND OF THE INVENTION a) Field of the Invention

The present invention relates to an optical low pass filter which is to be used in the so-called electronic image pickup systems adopting image pickup devices as imaging means.

b) Description of the Prior Art

It is widely practised in these days to observe images on TV monitors by using image pickup devices such as CCD sensors as imaging means. Rapid progresses are now being made, for example, in TV cameras and electronic still cameras for observations on the TV monitors. In particular, remarkable development has been made in a field of endoscopes which are to be inserted into human body cavities for medical diagnoses and treatments or into pipes for inspecting corrosion, etc. in inside walls.

Used for practical observations are, for example, electronic endoscopes which have solid-stage image pickup devices at leading ends thereof as shown in FIG. 25 and TV cameras which are equipped with external endoscopes for permitting observations of images formed by the endoscopes on TV monitors as shown in FIG. 26 by reimaging images of objects formed by fiber scopes or non-flexible endoscopes onto solid-state image pickup devices.

The electronic endoscope shown in FIG. 25 is equipped with a manual controller 2, a slender and flexible section 3 to be inserted, and a signal cable 4 which is branched in its course into two cables to be connected to a light source unit 5 and a video signal processing unit 6 respectively. Disposed on a leading end of the section 3 is an observation optical system which comprises an objective lens system 7, a quartz low pass filter 8 and a CCD image sensor 9 as well as an illumination optical system (not shown).

An illumination light bundle emitted from the light source unit 5 is transmitted to the leading end of the endoscope through a light guide fiber bundle (not shown) disposed in the signal cable and endoscope for illuminating an object M with the light bundle.

Rays reflected from the object M are formed, by the objective lens system 7, into an image on the CCD image sensor 9 and converted into electrical signals by the CCD sensor, led through the manual controller 2 and the signal cable 4 to the video signal processing circuit 6 for conversion into video signals and displayed as an image of the object M on a TV monitor for observation.

Further, as shown in FIG. 26 a TV camera which is equipped with a fiber scope and a non-flexible endoscope has an objective lens system 13 disposed on the leading end of a fiber scope 11 so that an image of the object M is formed by the objective lens system 13 on an end surface of incidence of an image guide fiber bundle 12; and is configured so as to transmit the image of the object M to an end surface of emergence of the image guide fiber bundle 12 for allowing observation of the image through an eyepiece 15. In addition, an objective lens system 17 is disposed on a leading end of a non-flexible endoscope 16 and a relay lens system 18 is disposed after the objective lens system 17 so that the image of the object M is transmitted through the relay lens system 18 for observation of the image through an eyepiece 19.

In FIG. 26, the reference numeral 20 represents an adaptor which is to be used for attaching a TV camera head 22 to the eyepiece 14 of the fiber scope or the non-flexible endoscope and has a built-in imaging lens system 21. Disposed in the TV camera head 22 are an optical low pass filter 23 which consists of a plurality of quartz plates and a CCD image sensor 24. The camera head 22 has an output cable connected to a camera control unit 25 comprising a video signal processing circuit. When the adaptor 20 is attached to the eyepiece 14 of the fiber scope or the non-flexible endoscope as described above, rays emerging from an eyepiece lens of the eyepiece 14 are condensed by the imaging lens system 21 and transmit through the optical low pass filter 23 for forming an image of the object M on the CCD image sensor 24. This image is converted into electrical signals, fed to the camera control unit 25 and further converted into video signals for displaying the image of the object M on the TV monitor 26 for observation.

The electronic imaging system described above allows phenomena which are called beat and moiré to be produced due to interference between spatial frequency components contained in the image of the object and a sampling period of picture elements disposed on the CCD image sensor since these picture elements have a constant period (sampling period).

As a conventional example which is configured so as to prevent the phenomena of beat and moiré, there is known an optical low pass filter which is configured so as to prevent the moiré by cutting off the spatial frequency components producing the moiré out of spatial frequency components contained in an image of an object by utilizing a spatial frequency limiting filter consisting of a birefringent plate as disclosed by Japanese Utility Model Publication No. Sho 47-18,688.

When a birefringent plate is used as an optical low pass filter as in the case described above, a spatial frequency bandwidth can be limited for a reason which is to be described below. FIG. 27 illustrates a composition of an optical system which is configured so as to form an image of an object by using a combination of an ideal lens component L and a birefringent plate 30. In this case, a light intensity distribution on a spot image formed by the optical system is expressed by the delta functions for the ordinary ray and the extraordinary ray as shown in FIG. 27. When a spacing between these two delta function is represented by t on a coordinates system shown in FIG. 28, Fourier transform of the delta function gives spatial frequency response which is to be obtained by using the birefringent plate. Since the birefringent plate has a modulation frequency function (MTF) which is expressed as MTF=|cos (πtu)| as shown in FIG. 29, it will be understood that a spatial frequency bandwidth can be limited. Further, the above-mentioned formula means that the MTF of the birefringent plate shown in FIG. 29 has a cutoff frequency 1/2t which can be controlled by controlling the spacing t between the delta functions (spot images). The spacing t can be controlled by adequately setting an angle formed by crystallographic axis of the birefringent plate intersecting with an optical axis of the birefringent plate and thickness of the birefringent plate. In other words, it is possible to prevent the production of the moiré by setting the cutoff frequency 1/(2t) shown in FIG. 29 at a spatial frequency of the image of the object at which the moiré is to be produced.

In case of the single-plate type color TV cameras which form a main current in practical use in these days, mosaic filter arrays for color encoding are disposed on surfaces of incidence of CCD image sensors. An image pickup device of this type allows not only the arrays of the picture elements but also the arrays of the filter elements to produce the beat, whereby the image pickup device is apt to allow the beat to be remarkable and cannot prevent the production of the moiré simply by limiting a spatial frequency bandwidth to such a degree as shown in FIG. 29. Further, in case of the TV camera which is equipped with the endoscope and configured so as to permit observation of the image formed by the endoscope while reimaging an image formed by the fiber scope onto the solid-state image pickup device, an object to be observed through the TV camera is an end surface of an optical image guide fiber as shown in FIGS. 30A and 30B and an image of the object has remarkably intense high-frequency components, whereby the TV camera cannot prevent the production of the moiré. Speaking concretely, the optical image guide fiber is composed of optical fibers each of which consists of a core covered with a cladding and an image formed on an end surface of emergence of the image guide fiber consists of a large number of light spots having a repeating period having a pitch PF of the cores. Accordingly, the image formed on the end surface of emergence contains high frequency components which were not contained in an original image formed by the objective lens system but correspond to the repeating period of the above-mentioned light spots. These high-frequency components make it difficult to eliminate the moiré.

As a conventional example which is configured so as to correct this defect, there are known optical low pass filters disclosed by Japanese Patents Kokoku Publication No. Hei 4-15,669 and Kokai Publication No. Sho 63-291,026. The optical low pass filters disclosed by these Japanese patents can exhibit an effect to limit spatial frequency bandwidths but have a common defect that these optical low pass filters require high manufacturing costs due to a fact that these filters use expensive birefringent plates.

SUMMARY OF THE INVENTION

A primary object of the present invention is to provide an optical low pass filter which has an effect to limit a spatial frequency bandwidth without using an expensive birefringent plate.

The optical low pass filter according to the present invention is characterized in that it is composed of a diffractive optical element which has a diffractive surface having imaging characteristics varying discontinuously. In other words, the optical low pass filter according to the present invention is characterized in that it is composed of a diffractive optical element which has regions having different imaging characteristics and joined so as to have discontinuous imaging characteristics.

Let us assume a lens system $L_1$ which images axial rays and another lens system $L_2$ which is obtained by displacing the lens system $L_1$ in a direction perpendicular to an optical axis thereof as indicated by the dashed lines as shown in FIG. 20. Since the axial rays for the lens system $L_2$ can be regarded as offaxial rays for the lens system $L_1$, the lens system $L_2$ forms an image at an offaxial location. That is to say, when an optical element is composed of an upper section which is disposed above an optical axis of the lens system $L_1$ and has the imaging function thereof, and a lower section which is disposed below the optical axis and has the imaging function of the lens system $L_2$, the optical element can have a function to separate a spot image into two images at two locations as shown in FIG. 21A, whereby this lens element exhibits an effect to limit a spatial frequency bandwidth which is similar to that obtainable with the birefringent plate shown in FIG. 27. Though the lens system $L_2$ is displaced in the direction perpendicular to the optical axis in FIG. 20, this lens system exhibits the similar effect even when it is inclined in an oblique direction which is different from the perpendicular direction.

Such an effect can be obtained not only with the refractive optical system described above but also with a diffractive optical element, and the latter provides an advantage to permit manufacturing surfaces which have complicated imaging functions through relatively simple procedures. That is to say, it is possible to compose an optical low pass filter, without using a birefringent plate, of a diffractive optical element having a plurality of diffractive surfaces which are eccentric with regard to an optical axis, have different imaging characteristics and jointed discontinuously.

Diffractive optical elements (DOE's) which permit positively utilizing the diffraction phenomenon of light are described, for example, on pages 46 to 53 SPID vol. 126 (1977). Contents on these pages can be summarized as follows:

An ordinary glass material refracts a ray according to Snell's law which is expressed by the following formula (1) or as illustrated in FIG. 22:

$$n \sin \theta = n' \sin \theta' \tag{1}$$

wherein the reference symbol n represents a refractive index of a medium disposed on the side of incidence, the reference symbol n' designates a refractive index of a medium disposed on the side of emergence, the reference symbol θ denotes an angle of incidence of the ray and the reference symbol θ' represents an angle of emergence of the ray.

In case of the diffraction phenomenon, on the other hand, a ray is refracted according to the law of diffraction expressed by the following formula (2):

$$n \sin \theta - n' \sin \theta' = m\lambda/d \tag{2}$$

wherein the reference symbol m represents a number of order of a refracted ray, the reference symbol λ designates a wavelength and the reference symbol d denotes a spacing between gratings.

A diffractive optical element (DOE) means an optical element which is configured so as to diffract rays according to the above-mentioned formula (2). A diffractive optical element which has an adequate focal length f can be obtained by varying d dependently on heights of rays and changing an angle of emergency θ' of the first order ray so that all the first order rays are condensed onto a certain definite point regardless of heights of the rays. However, the diffractive optical element which is obtained as described above is an optical element which is generally referred to as a Fresnel zone plate and concentrically shielded, thereby allowing remarkable loss of light intensity. Further, a diffractive optical element which has a form approximated to steps, as exemplified by the diffractive optical element disclosed by U.S. Pat. No. 499,880 or U.S. Pat. No. 3,911,179 has a low diffraction efficiency and allows flare to be produced, thereby degrading image qualities. When a diffractive optical element has a saw-tooth-like from which is referred to as kinoform shown in FIG. 23A, in contrast, it exhibits a diffraction efficiency of 100% for the first order rays. The diffraction efficiency of 100% for the first order rays is referred to as "blazing at a specific wavelength". However, it is difficult to form a diffractive optical element so as to have a completely saw-tooth-like sectional shape, and a diffraction efficiency can be varied by approximating a sectional shape to a stepped shape by etching as shown in FIG. 23B or FIG. 23C.

Actually, even the kinoform which can provide diffracted first order rays of 100% exhibits diffraction efficiencies which are different dependently on wavelengths and produces rays of unwanted orders, thereby allowing flare to be produced by rays other than the first order rays. However, a means which is to be described later can reduce the rays of unwanted orders to such a degree at which the diffractive optical elements are usable in practice. Ratios of the rays of unwanted orders can be calculated as diffraction efficiencies which are expressed by the following equation (50):

$$\eta_m = \sin c^2[\pi\{m - m_0(\lambda_0/\Delta n\,(\lambda_o)) \cdot (\Delta n(\lambda)/(\lambda)\}]\quad (50)$$

wherein the reference symbol $\lambda_0$ represents a wavelength which is expressed taking a diffraction efficiency as 1, the reference symbol $\lambda$ designates a wavelength at which a diffraction efficiency of interest is to be calculated, the reference symbol n' ($\lambda$) denotes a refractive index of a medium disposed on the side of emergence at a given wavelength which is ordinarily taken as 1, the reference symbol n($\lambda$) represents a refractive index of a medium disposed on the side of incidence at a given wavelength which is ordinarily a refractive index of a material of a diffractive optical element, the reference symbol $m_0$ designates a number of order at which the diffraction efficiency is 1 and the reference symbol m denotes a number of order at which the diffraction efficiency is to be calculated.

When a ray of the first order of the d-line, for example, is to be blazed with the kinoform by using a glass material having a refractive index n of 1,883 (when a diffraction efficiency is to be 100% at a given number of order and a given wavelength as described above), the equation (50) can be transformed into the following formula (51):

$$\eta_m = \sin c^2[\pi\{m - m_0(587.56/1 - 1.883)(1 - n(\lambda)/\lambda)\}]\quad (51)$$

This formula gives calculation results which are listed below:

|  | −1 | 0 | 1 | 2 | 3 | n ($\lambda$) |
|---|---|---|---|---|---|---|
| g-line (435.83 nm) | 1.57% | 4.64% | 59% | 24.1%3. | 46% | 1.91049 |
| F-line (486.13 nm) | 0.89% | 2.92% | 83.8% | 7.44% | 1.41% | 1.89822 |
| e-line (546.07 nm) | 0.15% | 0.56% | 97.8% | 0.79%0. | 18% | 1.88814 |
| d-line (587.56 nm) | 0% | 0% | 100% | 0% | 0% | 1.88300 |
| C-line (656.27 nm) | 0.33% | 1.5% | 96% | 0.96%0. | 27% | 1.87656 |
| A-line (768.19 nm) | 1.62% | 8.75% | 81.5% | 3.19% | 0.98% | 1.86947 |

FIG. 35 shows a graph illustrating the calculation results listed above. When attention is paid only to m=1 in the equation (51) and the rays other than the ray of the zero order are assumed to produce flare, a ratio $\epsilon$ of incident rays producing flare can be expressed by the following equation (52):

$$\epsilon = 1 - \eta_1 \quad (52)$$

FIG. 36A shows a graph illustrating conceptional relationship between wavelengths and the ratio $\epsilon$. Flare F within a wavelength region of $\lambda_1 < \lambda < \lambda_2$ ($\lambda_1 < \lambda_2$) which is represented by areas of the slashed sections in FIG. 36A can be calculated according to the following equation (53):

$$F = \int_{\lambda_1}^{\lambda_2} \epsilon\, d\lambda \quad (53)$$

In FIGS. 36A, 36B, and 36C the reference symbol $\lambda_0$ represents a blaze wavelength.

When the diffractive optical element has a sectional shape which is approximated not to the kinoform $$F = \int_{\lambda_1}^{\lambda_2} \epsilon\, d\lambda$$

shown in FIG. 27A but to the kinoform shown in FIG. 23B, for example, the diffractive optical element has a diffraction efficiency $\eta_1' \approx 0.95$ to 0.99 in contrast to the diffraction optical element which has the ideal kinoform and the diffraction efficiency=1 at the blaze wavelength $\lambda_0$. Accordingly, the diffractive optical element which has the sectional shape approximated to the kinoform shown in FIG. 23B allows flare to be produced at a ratio of $\epsilon' = 1 - \eta_1$ (wherein $\epsilon'$ is higher than $\epsilon$) and produces flare F expressed by the formula (53) within a wavelength region of $\lambda_1 < \lambda < \lambda_2$ ($\lambda_1 < \lambda_2$).

Though it is general to allocate the d-line to a blaze wavelength, the areas of the slashed sections can be reduced by shifting the curve in the direction of wavelengths as shown in FIG. 36C. This fact gives a suggestion that a ray other than the d-line has a blaze wavelength $\lambda_0$ that minimizes flare within a wavelength region to be used by the diffractive optical elements.

When a blaze wavelength which minimizes flare F within a given wavelength region of $\lambda_1 < \lambda < \lambda_2$ ($\lambda_1 < \lambda_2$) is represented by $\lambda_0$, this fact means that there establishes the following formula (54):

$$F = \mathrm{Min}\int_{\lambda_1}^{\lambda_2}\left[1 - \mathrm{sinc}^2\left\{\pi\left(m - m_0\frac{\lambda_0}{n'(\lambda_0) - n(\lambda_0)}\cdot\frac{n'(\lambda) - n(\lambda)}{\lambda}\right)\right\}\right]d\lambda \quad (54)$$

In the discussion made above on the formula (52) wherein the ray of the first order is selected and a number of order for blazing is selected so as to reduce flare, $m_0$ should desirably be equal to m, and each of $m_1$ and $m_0$ is equal to 1. Further, "Min" used in the formula (54) means that F has a minimum value.

FIG. 37 visualizes results of concrete calculations obtained by using $\lambda_1 = 400$ nm, $\lambda_2 = 700$ nm, m=1 and n(d)= 1.88300. These results indicate that a blaze wavelength $\lambda_0$ which minimizes F is located in the vicinity of 560 nm or that flare can be reduced to the vicinity of a minimum amount thereof by selecting $\lambda_0$ within a range of 500 nm$<\lambda_0<$610 nm. That is to say, flare is little when an integral of the value which is calculated by the equation (32) or shown in FIG. 37 has a small value. This indicates that flare is minimum or nearly minimum when a diffractive optical element is manufactured so as to have a blaze wavelength within the range from 500 nm to 610 nm.

When an infrared cutoff filter has a transmittance characteristic shown in FIG. 38 and a solid-state image pickup device has a spectral sensitivity characteristic shown in FIG.

39, a combination of the infrared cutoff filter and the solid-state image pickup device has a total sensitivity characteristic illustrated in FIG. 40. This total spectral sensitivity characteristic has a peak in the vicinity of the wavelength of the d-line and is rather lowered in the vicinities of the wavelengths of the F-line and the C-line. For this reason, blue signals and red signals are amplified during actual processings of video signals so that sensitivity is flat in a section between the wavelengths of the F-line and the C-line. Accordingly, flare produced by the diffractive optical element is also amplified and the blaze wavelength $\lambda_0$ must be set so as to establish the formula (54) independently of the characteristics of the image pickup device and the infrared cutoff filter. In such a case, the diffractive optical element is to be applied to an optical instrument such as a still video camera which utilizes natural colors.

In an endoscope in which an illumination light bundle is transmitted through an optical fiber bundle of a light guide cable, however, the optical fibers have a characteristic to allow rays of short wavelengths to be absorbed by the cores, thereby attenuating rays which have wavelengths in the vicinity of that of the F-line. Accordingly, rays having the wavelengths in the vicinity of the wavelength of the F-line are attenuated on an image formed by the endoscope and it is necessary for flattening sensitivity between the wavelength of the F-line and that of the C-line to enhance amplification ratios for the rays having wavelengths in the vicinity of that of the F-line. However, the amplification ratios cannot be enhanced so much in practice since noise is increased due to degradation of S/N ratio which is caused by remarkable enhancement of the amplification ratios. Therefore, the image formed by the endoscope has a sensitivity characteristic which is rather lowered in the vicinity of the wavelength of the F-line within the wavelength region between the wavelength of the F-line and that of the C-line.

When a sensitivity characteristic weighted as described above is represented by $W(\lambda)$, the ratio $\epsilon'$ of the rays to produce flare out of the incident rays is expressed by the following equation (55):

$$\epsilon' = W(\lambda)(1-\eta_1) \quad (55)$$

The equation (55) can be transformed into the following equation (56):

$$F = \int_{\lambda_1}^{\lambda_2} \epsilon' d\lambda \quad (56)$$

When the equation (56) is illustrated in a concentional diagram similar to those shown in FIG. 36A, FIG. 36B and FIG. 36C, $\epsilon'$ is made lower on the side of the short wavelength $\lambda_1$ under an influence due to the weight as shown in FIG. 42B. Though favorable results were obtained when $\lambda_0$ is nearly equal to 560 nm in the discussion made above, the ratio of the rays to produce flare is lowered as a whole or F' has a smaller value when $\lambda_0$ is set at a wavelength longer than 560 nm as seen from FIG. 42B.

As is understood from the foregoing description, it is possible to make flare due to rays of unwanted orders unnoticeable by setting a blaze wavelength at an adequate value in accordance with characteristics of a solid-state image pickup device, a light source unit and a signal processing unit which are to be used. For the reason described above, use of a diffractive optical element having the kinoform shape is effective for obtaining an optical low pass filter which has excellent optical performance and can be manufactured at a low cost.

Such a diffractive optical element can be designed by using an ordinary automatic lens program while assuming that a lens which is called a ultra-high index lens to be as a diffractive optical element. This fact is described on pages 46 to 53, SPIE Vol. 126 (1977). To a ultra-high index lens which has a refractive index n>>1, relationship expressed by the following formula (3) applies:

$$(n_u-1)dz/dh = n\sin\theta - n'\sin\theta' \quad (3)$$

wherein the reference symbol n' represents a refractive index of a medium located on the emergence side, the reference symbol n designates a refractive index of a medium located on the incidence side, the reference symbols $\theta$ and $\theta'$ denote an angle of incidence and an angle of emergence respectively of interest, and the reference symbol z represents a distance as measured from an origin at a height of ray of interest and in a direction along the optical axis on a coordinates system on the ultra-high index lens. Further, the reference symbol $n_u$ designates a refractive index of the ultra-high index lens and the reference symbol h denotes a height of the ray of interest.

From the formula (2) and (3), we obtain the following formula (4):

$$(n_u-1)dz/dh = m\lambda/d \quad (4)$$

When the ultra-high index lens element is defined as an aspherical surface, z is expressed by the following formula (5):

$$z = Cy^2/[1+(1-C^2P_y^2)^{1/2}] + B_y^2 + E_y^4 + F_y^6 \quad (5)$$

wherein z is a distance as measured along the z axis shown in FIG. 24 (a direction toward an image is taken as positive), the reference symbol y represents a distance in the meridional direction perpendicular to the z axis on a coordinate system on which an intersection between the aspherical surface and the z axis is taken as an origin, the reference symbol C represents curvature on a reference sphere of the aspherical surface, the reference symbol P designates a conical constant which has a value given as $P=1-e^2$ (e is eccentricity), and the reference symbols B, E, F, G, . . . denote aspherical surface coefficients of the second, fourth, sixth, eighth, . . . orders respectively. In addition, the reference symbol O represents an object and the reference symbol I designates an image in FIG. 24.

On the basis of the formulae (4) and (5), a pitch d on the diffractive optical element at a given height of ray is expressed by the following equation (6):

$$d = m\lambda/(n_u-1)\{Ch/(1-C^2Ph^2)^{1/2} + 2Bh + 4Eh^3 + 6Fh^5 + 8Gh^7 + \ldots\} \quad (6)$$

It is therefore possible, by performing lens design with a ultra-high index lens, to determine a shape of a diffractive optical element which has numerical data equivalent to those of the ultra-high index lens.

BRIEF DESCRIPTION OF THE DRAWINGS

FIGS. 21A and 21B show sectional views illustrating a function to separate a spot image by the optical system shown in FIG. 20;

FIGS. 23A through 23C show diagrams illustrating sectional shapes of diffractive optical elements which are approximated to steps;

FIG. 24 shows a diagram illustrating a coordinates system for defining an aspherical surface as an ultra-high index lens element;

DETAILED DESCRIPTION OF THE PREFERRED EMBODIMENTS

Now, the optical low pass filter according to the present invention will be described more detailedly below with reference to the preferred embodiments illustrated in the accompanying drawings.

Figure 2:
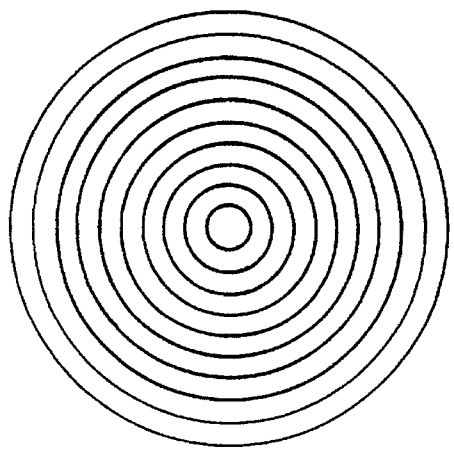
FIG. 2 shows a diagram illustrating a fundamental composition of a diffractive optical element.

FIG. 2 shows a front view of a diffractive optical element (DOE) which is designed by utilizing the ultrahigh index method or the similar technique. Let us assume that the diffractive optical element is optimized to an image pickup system to be combined therewith and groove pitch d on the diffractive optical element at a height h of ray of interest is expressed by the following equaiton (7):

$$d = m\lambda / [(n_u - 1)\{Ch/(1 - C^2 P h^2)^{1/2} + 2Bh + 4Eh^3 + 6Fh^5 + 8Gh^7 + \ldots\}] \quad (7)$$

Figure 1:
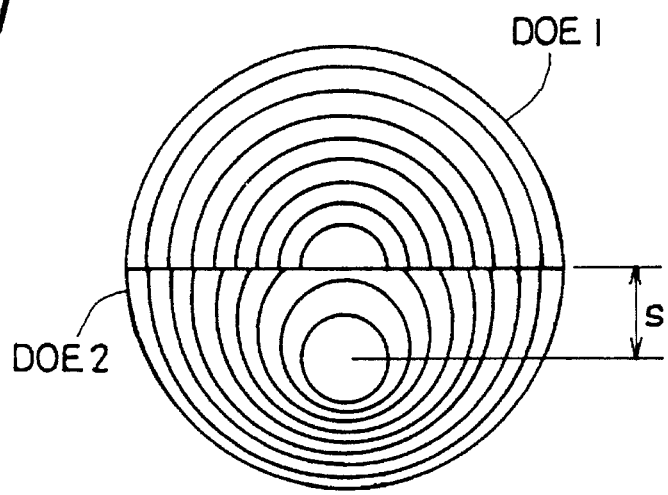
FIG. 1 shows a diagram illustrating a composition of a first embodiment of the optical low pass filter according to the present invention.

FIG. 1 shows the first embodiment of the optical low pass filter according to the present invention which is obtained by connecting the diffractive optical element DOE1 shown in FIG. 2 to another diffractive optical element DOE2 which is made eccentric by displacing an optical axis thereof in parallel with that of the DOE1 for a distance s. A pitch on the diffractive optical element DOE2 of the first embodiment shown in FIG. 1 is expressed by the following formula (8):

$$d(1) = m\lambda/[(N_u - 1)\{C(h + s)/(1 - C^2P(h + s)^2)^{1/2} + \qquad (8)$$
$$2B(h + s) + 4E(h + s)^3 + 6F(h + s)^5 +$$
$$8G(h + s)^7 + \ldots \}]$$

The drawings, including FIG. 1, illustrating the embodiments of the low pass filter according to the present invention are conceptional diagrams which do not show actual shapes of the optical low pass filter. In the diffractive optical element shown in FIG. 1, rays which are incident on the diffractive optical element DOE1 having the ordinary imaging function, out of rays coming from an on-axis object point, are imaged on an on-axis image point, whereas rays which are incident on the diffractive optical element DOE2 having an eccentric imaging function are imaged on an off-axis image point. Therefore, the diffractive optical element consisting of DOE1 and DOE2 separates a spot image into two or has a bandwidth limiting effect like that of a birefringent plate, whereby being usable as an optical low pass filter. When a distance between these two separate spot images is represented by t, a cutoff frequency $1/(2t)$ which is an important performance item of the optical low pass filter can be determined by the following equation (9):

$$t = \beta_1 s - s = -z's/f - s = fs/z - s \qquad (9)$$

wherein the reference symbol f represents a focal length of the diffractive optical element, the reference symbol s designates eccentricity, the reference symbol $\beta_1$ denotes a paraxial magnification of the optical element DOE2 having eccentric multiple surfaces, the reference symbol z represents an object distance for the diffractive optical element and the reference symbol z' represents an image distance for the diffractive optical element.

When a cutoff frequency is to be set at 50 (lines/mm), for example, the eccentricity s can be calculated by the following equation (10):

$$s = z/(100 \cdot (f - z)) \qquad (10)$$

Since $\beta_1$ is varied by changing the object distance in the equation (9), the cutoff frequency $f_c$ is changed dependently on the object distance. Since the cutoff frequency $f_c$ is low for a short object distance and high for a long object distance as is judged from the equation (9), it is generally sufficient to select a standard cutoff frequency for a relatively short object distance.

When it is undesirable that the cutoff frequency $f_c$ varies dependently on object distances, the diffractive optical element should be combined with another optical element. When an optical system having a magnification $\beta_2$ is disposed after the multiple surfaces, for example, a distance $t(1)$ between the separated spot images is given by the following equation (11):

$$t(1) = (\beta_1 - 1)s\beta_2 = -(z'/f - 1)s\beta_2 = (f/z - 1)s\beta_2 \qquad (11)$$

Further, the cutoff frequency $f_c$ is given by the following equation (12):

$$f_c = 1/\{2t(1)\} = 1/\{2(\beta_1 - 1)s\beta_2\} \qquad (12)$$

Since $f_c = 1/\{2t(1)\} = C$ (constant) is a sufficient requisition for making the cutoff frequency $f_c$ constant irrespective of object distances, it is sufficient that $\beta_2$ satisfies the following condition (13):

$$\beta_2 = C/\{2(\beta_1 - 1)s\} \qquad (13)$$

Figure 33:
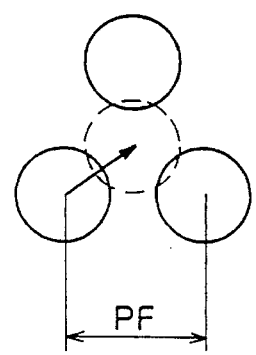
FIG. 33 shows a diagram illustrating relationship between an optical fiber and separated images.

In case of an optical low pass filter which is optimum for a TV camera equipped with an external endoscope and is to be used for forming an image of an end surface of the optical image guide fiber shown in FIG. 30, for example, a frequency spectrum of the optical image guide fiber is to be set as a cutoff frequency of the optical low pass filter. By configuring the diffractive optical element so as to form separated images at centers of three cores disposed in a shape of an equilateral triangle as shown in FIG. 33 in this case, the distance $t(1)$ between the separated spot images is:

$$t(1) = \sqrt{3}/4 \, PF$$

wherein the reference symbol PF represents a distance between optical fibers (an arrangement pitch of cores) on an image of an end surface of an image guide fiber.

It is therefore sufficient for obtaining the cutoff frequency which is constant independently of object distances to satisfy the following condition (14):

$$2/(\sqrt{3} \cdot PF) = 1/\{2(\beta_1 - 1) \cdot \beta_2 \cdot s\} \qquad (14)$$

Figure 29:
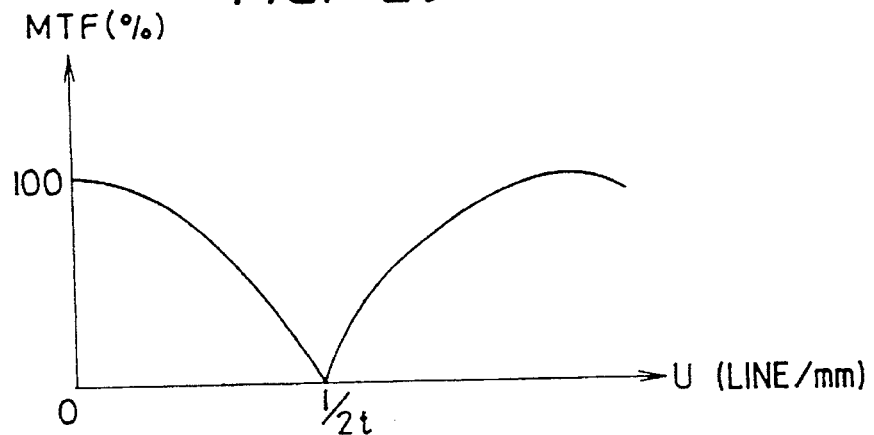
FIG. 29 shows a graph illustrating an MTF curve of the optical system shown in FIG. 27.

Such an optical low pass filter has an MTF which has a shape of a cosine function as shown in FIG. 29, but moiré due to the end surface of the optical image guide fiber is unnoticeable when the MTF is 20% or lower at a spatial frequency of interest. Accordingly, it can be regarded that the MTF is cut off within a frequency-region specified below:

$$0.87/2t(1) < u < 1.13/2t(1)$$

By using the formulae (13) and (14), this relationship can be rewritten as expressed by the following formula (15):

$$0.87 \cdot 2/(\sqrt{3} \cdot PF) < 1/\{2(\beta_1 - 1) \cdot \beta_2 \cdot s\} < 1.13 \cdot 2/(\sqrt{3} \cdot PF) \qquad (15)$$

When this relationship is not satisfied, the MTF has a value exceeding 20%, thereby making it impossible to favorably eliminate the spatial frequency spectrum from the image of the end surface of the optical image guide fiber. In such a case, the optical low pass filter has lowered response if the optical low pass filter does not separate a spot image into two but can separate it into three or more. Accordingly, an optical low pass filter which is capable of separating a spot image into three or more can have a frequency region broader than that defined by the formula (15) and is sufficient so long as it satisfies the following condition (16):

$$0.69 \, PF/\{4(\beta_1 - 1) \cdot s\} < \beta_2 < 2.77 \cdot PF/\{4(\beta_1 - 1) \cdot s\} \qquad (16)$$

If $0.69 \, PF/\{4(\beta_1 - 1) \cdot s\}$ is larger than $\beta_2$ in the above-mentioned condition (16), resolution will be lowered. If $\beta_2$ is larger than $2.77 \, PF/\{4(\beta_1 - 1) \cdot s\}$ in contrast, the image of the end surface of the optical image guide fiber will not interfere with the picture elements on the CCDs, but an image of an object will interfere with the picture elements on the CCD's.

When it is desired to obtain an optical low pass filter which is matched with a characteristic of the solid-state image pickup device, it is sufficient to set a sampling frequency $f_n$ for the solid-state image pickup device as defined by the following condition (17):

$$f_n = 1/(2(\beta_1-1)\cdot\beta_2\cdot s) \tag{17}$$

Calculations similar to those already described above give the following condition (18):

$$0.87 f_n < 1/\{2(\beta_1-1)\cdot\beta_2\cdot s\} < 1.13 f_n \tag{18}$$

If the condition (18) is not satisfied, the optical low pass filter will have an MTF of nearly 20% or higher at a frequency of 0.87 $f_n$ or 1.13 $f_n$, thereby making it impossible to sufficiently eliminate fold-back distortion produced at the sampling frequency. It is possible to obtain the cutoff frequency $f_c$ which is constant independently of object distances by using a correcting optical system having the magnification $\beta_2$ described above. Since such a correcting optical system has a magnification which is changed dependently on object distances, this optical system can be obtained by moving a section of the optical system in conjunction with focusing so that the magnification thereof satisfies the above-mentioned condition (18).

Though it is sometimes difficult to change a magnification of a correcting optical system dependently on object distances in an ordinary objective lens system, a TV camera which is to be used in a condition where it is attached to an eyepiece of an endoscope is free from such changes of magnification dependent on variations of object distances since an object distance for the TV camera is determined dependently on diopter of the eyepiece. Accordingly, electronic imaging systems of this type are suited in particular for use as optical systems to which the optical low pass filter described is to be applied. Such an optical low pass filter can be obtained by using refractive optical elements in place of the diffractive optical elements.

Figure 3:
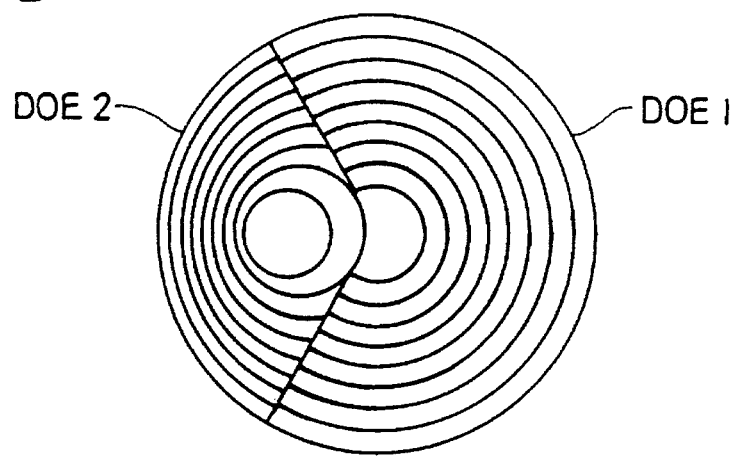
FIG. 3 shows a diagram illustrating a composition of a second embodiment of the optical low pass filter according to the present invention.
Figure 4:
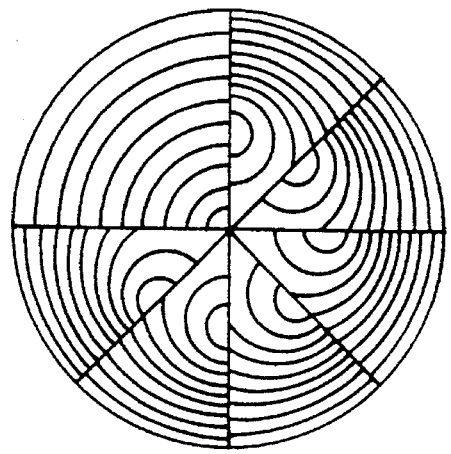
FIG. 4 shows a diagram illustrating a composition of a third embodiment of the optical low pass filter according to the present invention.
Figure 5:
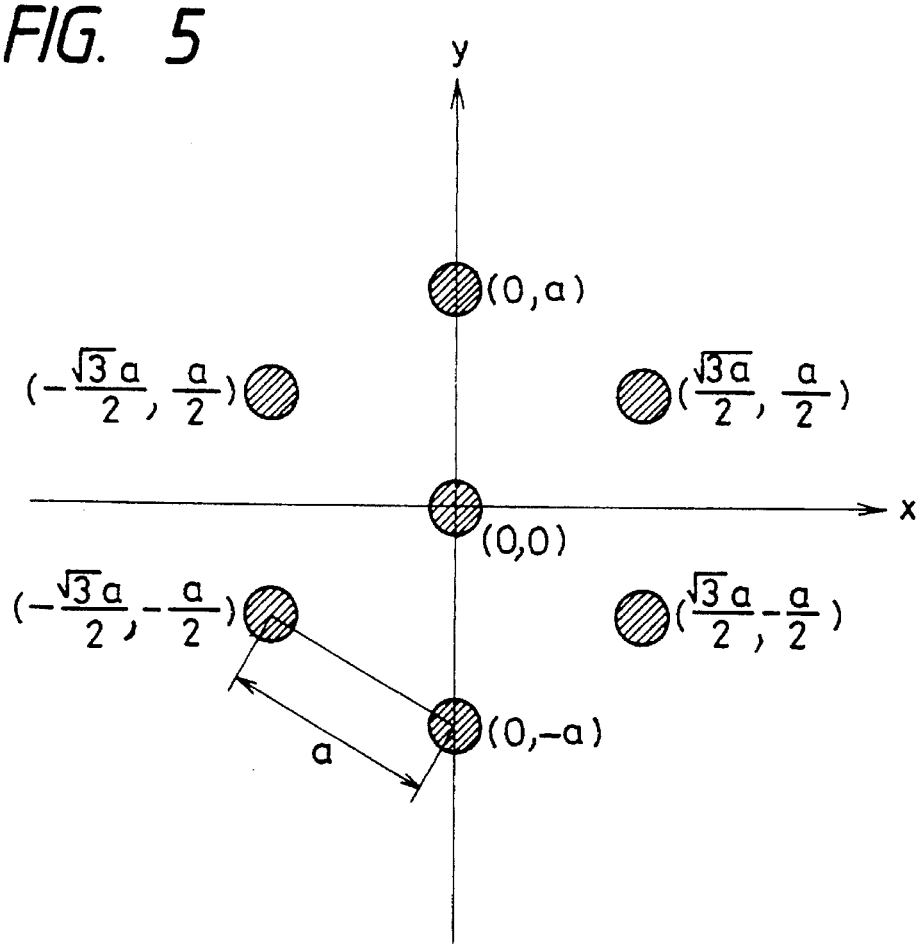
FIG. 5 shows a diagram illustrating patterns obtained by separating a spot image formed by the third embodiment of the present invention.
Figure 6A:
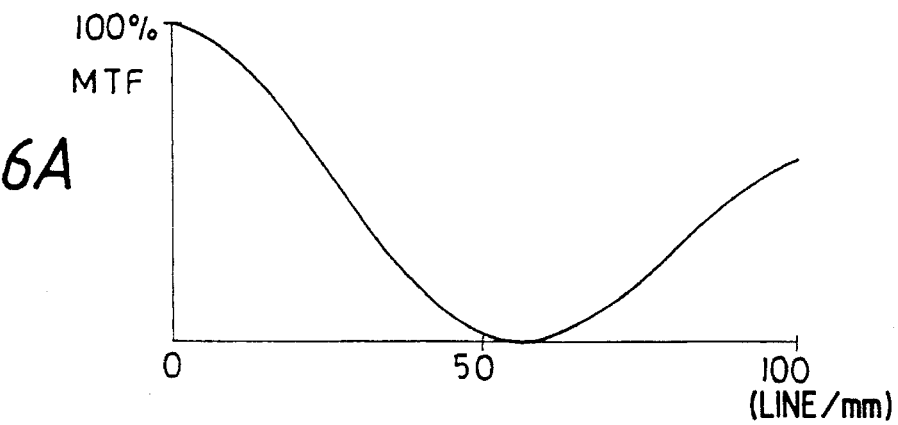
FIG. 6A through FIG. 6D show graphs visualizing MTF curves of the patterns shown in FIG. 5.
Figure 6B:
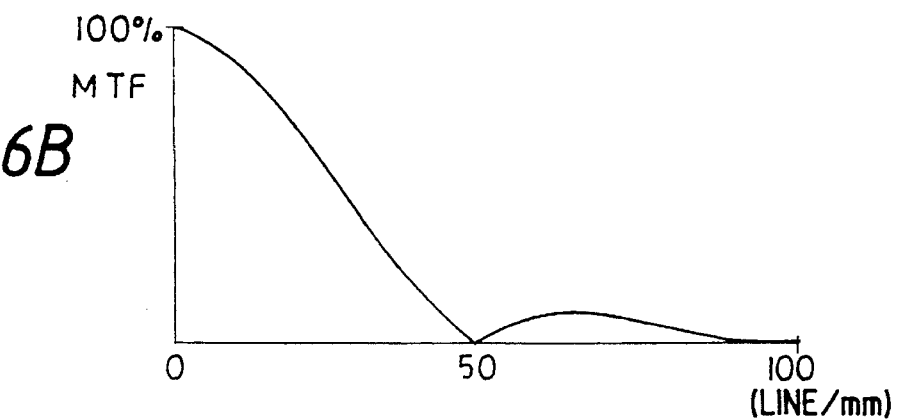
Figure 6C:
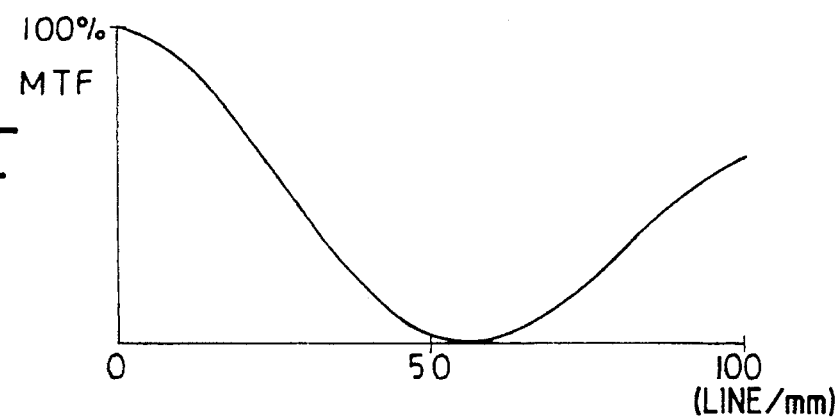
Figure 6D:
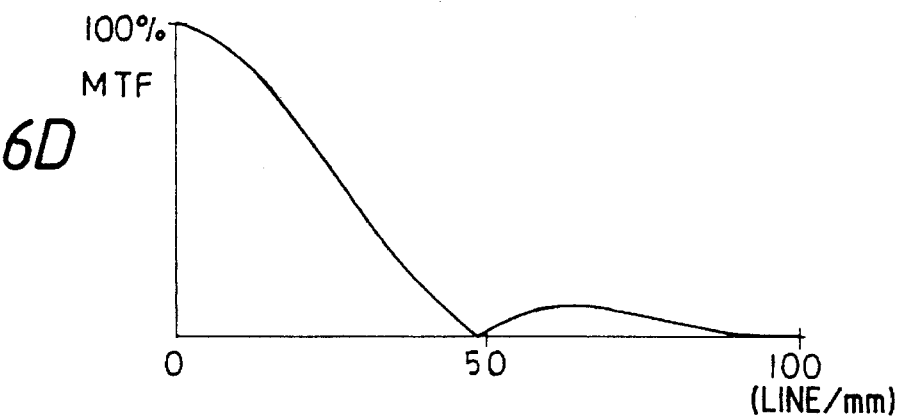

The first embodiment of the present invention is composed by dividing a region of a diffractive optical element into two, whereas the second embodiment of the present invention consists of an eccentric region, and another region which is not eccentric and has an area different from the eccentric section as shown in FIG. 3 so that light intensity ratios are different between separated spot images. Further, the third embodiment of the present invention has an increased number of diffractive regions which have eccentric imaging characteristics, whereby the third embodiment can form a larger number of separated spot images and have a higher effect to limit a spatial frequency bandwidth. The third embodiment is an optical low pass filter which is optimum for use with such TV cameras equipped with external endoscopes for forming images of end surfaces of optical image guide fiber as shown in FIG. 30. A quarter of the entire region of the third embodiment is composed of a diffractive optical element which is not eccentric, whereas the rest region is divided into six equal sections which are made eccentric in six directions intersection with one another at 60° so that the optical low pass filter preferred as the third embodiment separates a spot image into six patterns located on a hexagon traced around an origin shown in FIG. 5. The separated patterns of a spot image shown in FIG. 5 give such MTF curves as illustrated in FIG. 6A, FIG. 6B, FIG. 6C and FIG. 6D. FIG. 6A, FIG. 6B, FIG. 6C and FIG. 6D show the MTF curves in a horizontal direction, a direction of 30°, a direction of 60° and a vertical direction respectively. The horizontal direction means a direction in a spatial frequency space which corresponds to the x axis in FIG. 5, whereas the vertical directions means a direction corresponding to the y axis. The direction of 30° means a direction which is inclined 30° toward the vertical direction from the horizontal direction. Further, the direction of 60° is defined similarly to the direction of 30°. For tracing the MTF curves shown in FIG. 6A through FIG. 6D, spatial frequencies are calculated taking "a" as 0.01031 mm and assuming that a light intensity on the spot image located at the origin is twice as high as that on the other images. Therefore, the third embodiment is capable of favorably eliminating moiré produced due to interference between the CCD arrays and image guide fiber bundle when a frequency spectrum of the image guide fiber bundle is set at a cutoff frequency of the optical low pass filter.

Figure 34:
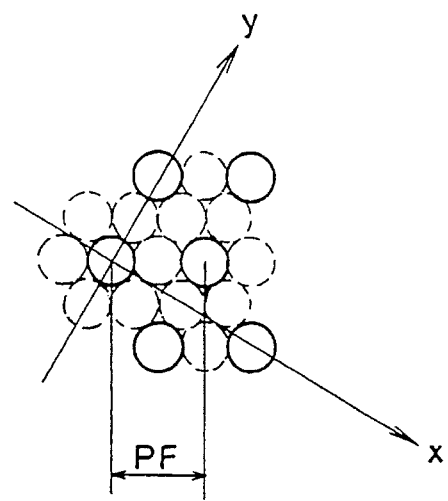
FIG. 34 shows a diagram illustrating relationship between an optical fiber and separated images.

When an optical fiber arrangement and separated spot images are set in such relationship as illustrated in FIG. 34, we obtain:

$$(\sqrt{3}/2)\cdot PF = \sqrt{3}\cdot a$$

wherein the reference symbol a represents a length of a side of the hexagon of the separated spot images and the reference symbol PF designates a distance between centers of the optical fibers on an image of the end surface of the optical image guide fiber.

This relationship gives the following formula (19):

$$PF = 2a \tag{19}$$

Setting as a target a range within which MTF is approximately 20% as is judged from FIG. 6, it is sufficient to set a within a range which is defined below:

$$0.73\cdot\sqrt{3}/2\cdot PF < \sqrt{3}\cdot a < 1.48\cdot\sqrt{3}/2\cdot PF$$

Hence, it is sufficient that a is within a range defined by the following condition (20):

$$0.36\cdot PF < a < 0.74\cdot PF \tag{20}$$

If the condition (20) is not satisfied, or if a is smaller than 0.36 PF or larger than 0.74 PF, the optical low pass filter has an MTF exceeding approximately 20% at a frequency of $$1/(0.73\cdot\sqrt{3}/2\cdot PF) \text{ or } 1/(1.48\cdot\sqrt{3}/2\cdot PF)$$

thereby being incapable of sufficiently attenuating a spatial frequency spectrum in piling directions of the optical fibers. The piling directions of the optical fibers mean the three directions intersecting at 120° shown in FIG. 30B in each of which the optical fibers form a row.

Such light intensity distributions on spot images can be obtained only by using a combination of three birefringent plates and two depolarizing plates, but a manufacturing cost of the optical low pass filter can be remarkably lowered by using refractive optical elements such as lenses and prisms or diffractive optical elements.

Figure 7:
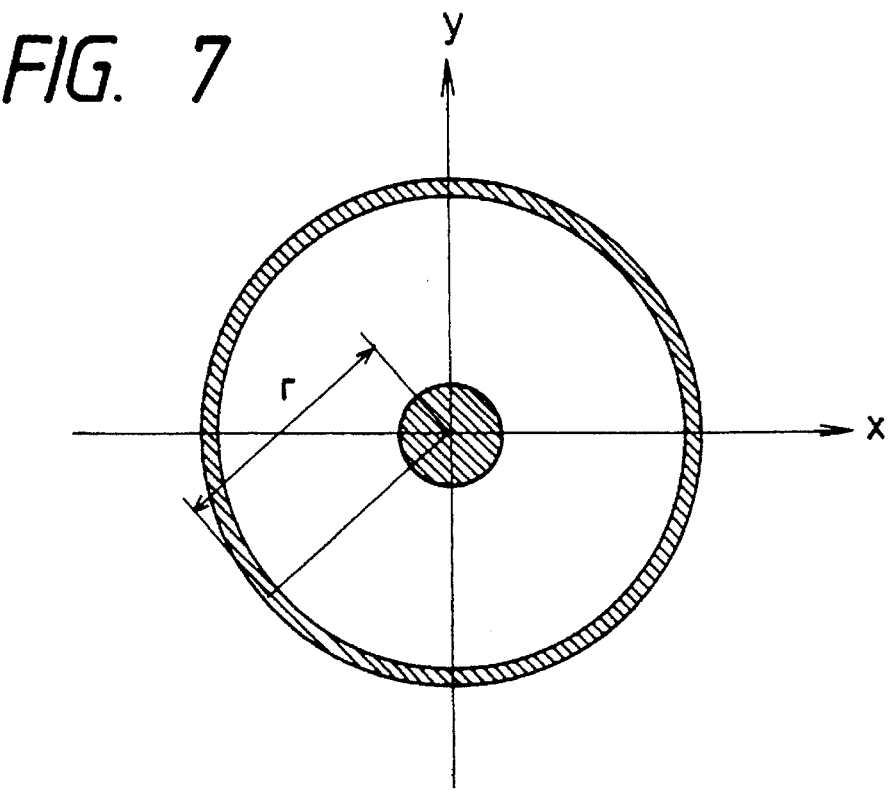
FIG. 7 shows a diagram illustrating a pattern which is obtained by approximating one of the patterns shown in FIG. 5 to a circle.
Figure 8:
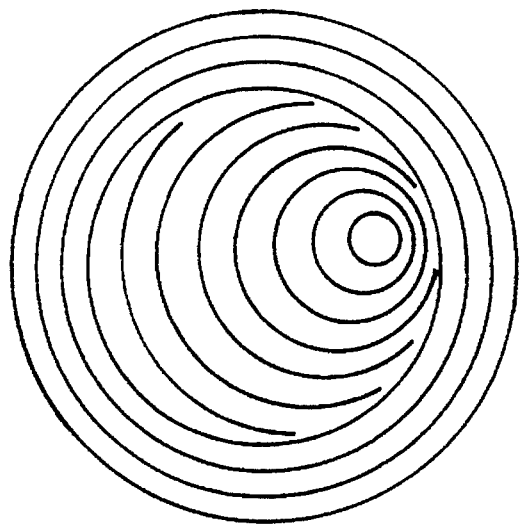
FIG. 8 shows a diagram illustrating a composition of a fourth embodiment of the optical low pass filter according to the present invention.

The patterns of the spot image shown in FIG. 5 can be approximated to circular patterns illustrated in FIG. 7. For obtaining the patterns of a spot image shown in FIG. 7, it is sufficient to satisfy the following condition:

$$0.73\cdot\sqrt{3}/2\cdot PF < 2\cdot r < 1.48\cdot\sqrt{3}/2\cdot PF$$

wherein the reference symbol r represents a distance as measured from the center of the spot image to the outer ring.

The above-mentioned condition leads to the following condition (21):

$$0.31 \cdot PF < r < 0.64 \cdot PF \tag{21}$$

If r is smaller than 0.31·PF or larger than 0.64·PF in the condition (21), the optical low pass filter has an MTF exceeding approximately 20% at a frequency of $$1/(0.73 \cdot \sqrt{3}/2 \cdot PF) \text{ or } 1/(1.48 \cdot \sqrt{3}/2 \cdot PF),$$

thereby being incapable of sufficiently attenuating the spatial frequency spectra in the piling directions of the optical fibers.

The fourth embodiment of the present invention consists of a diffractive optical element which has a central diffractive region having an eccentric imaging function and an outer circumferential diffractive region which is not eccentric, or has grooves formed concentrically.

Figure 9:
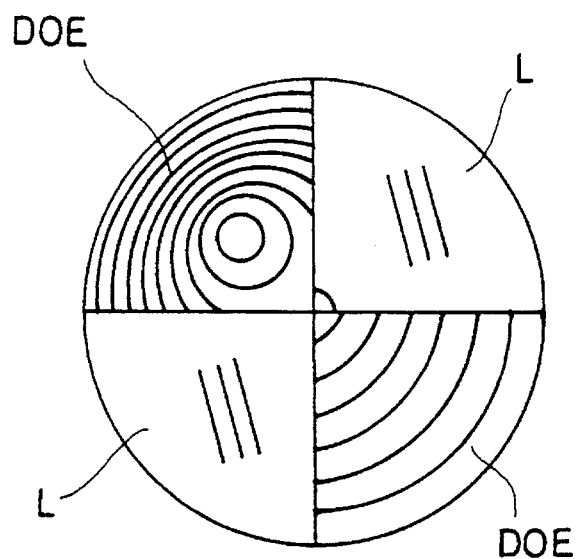
FIG. 9 shows a diagram illustrating a composition of a fifth embodiment of the optical low pass filter according to the present invention.

Further, the fifth embodiment of the present invention consists of a combination of diffractive optical elements and ordinary lens elements which are made of a glass or plastic material as shown in FIG. 9. In this drawing, the reference symbol DOE represents the diffractive optical element and the reference symbol L designates the ordinary lens element.

Figure 10:
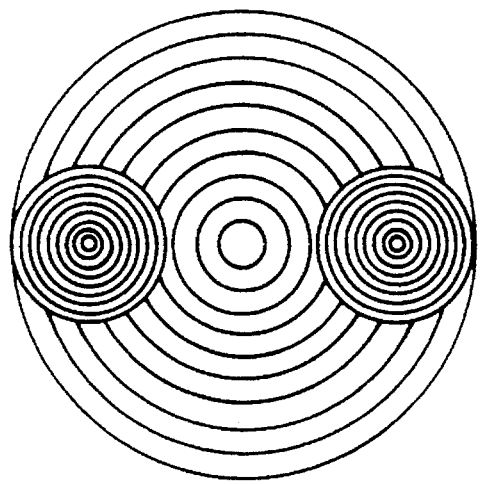
FIG. 10 shows a diagram illustrating a composition of a sixth embodiment of the optical low pass filter according to the present invention.

The sixth embodiment of the present invention has a configuration shown in FIG. 10 which is selected for increasing eccentricity. The two diffractive surfaces may be formed on one side of a transparent member. Alternately, the sixth embodiment may be configured by forming one diffractive surface on one side and the other diffractive surface on the other side of a transparent member. The sixth embodiment can be composed only of diffractive regions which have eccentric imaging functions in a manner which is not shown.

Figure 43A:
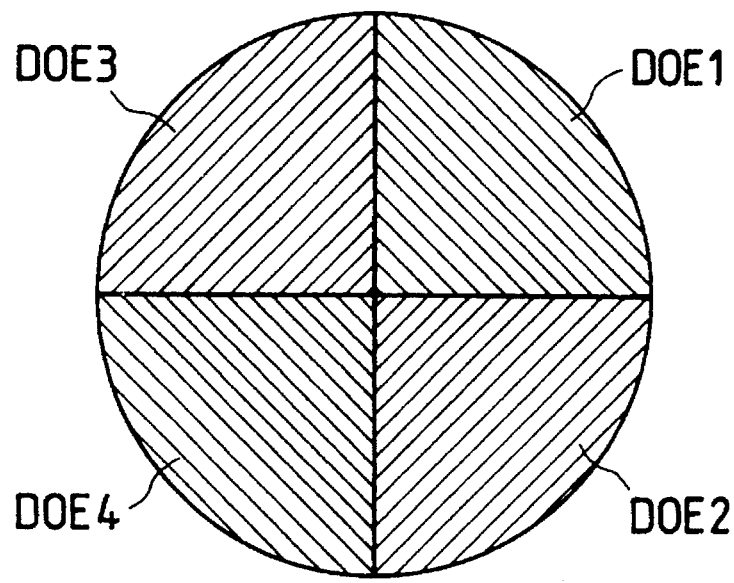
FIGS. 43A and 43B show the optical low pass filter according to the present invention which is configured so as to perform a pupil splitting only.
Figure 43B:
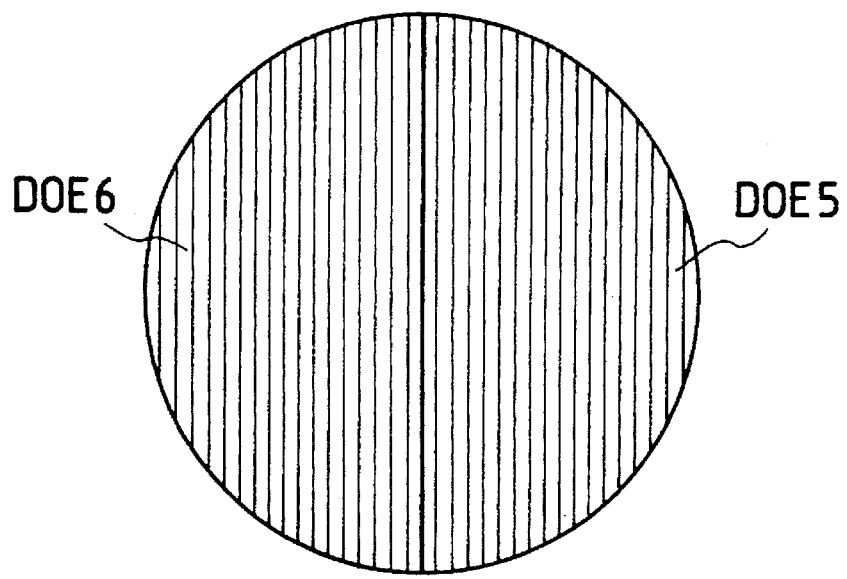

All of the optical low pass filters preferred as the first through sixth embodiments of the present invention have optical powers, thereby allowing optical systems to be set so that images are formed by the optical low pass filters (diffractive optical elements). However, it is possible to configure the diffractive optical elements so that they have no optical powers and function only as optical low pass filters, and use the diffractive optical element in combination with other optical elements or optical systems. For example, it is possible to compose a diffractive optical elements of DOE1, DOE2, DOE3 and DOE4 as shown in FIG. 43A or DOE5 and DOE6 so that the diffractive optical elements function as an optical low pass filter for dividing a pupil and has no optical power. In such a case, the object of the present invention can be accomplished by using the diffractive optical element in combination with another imaging optical system.

Figure 11A:
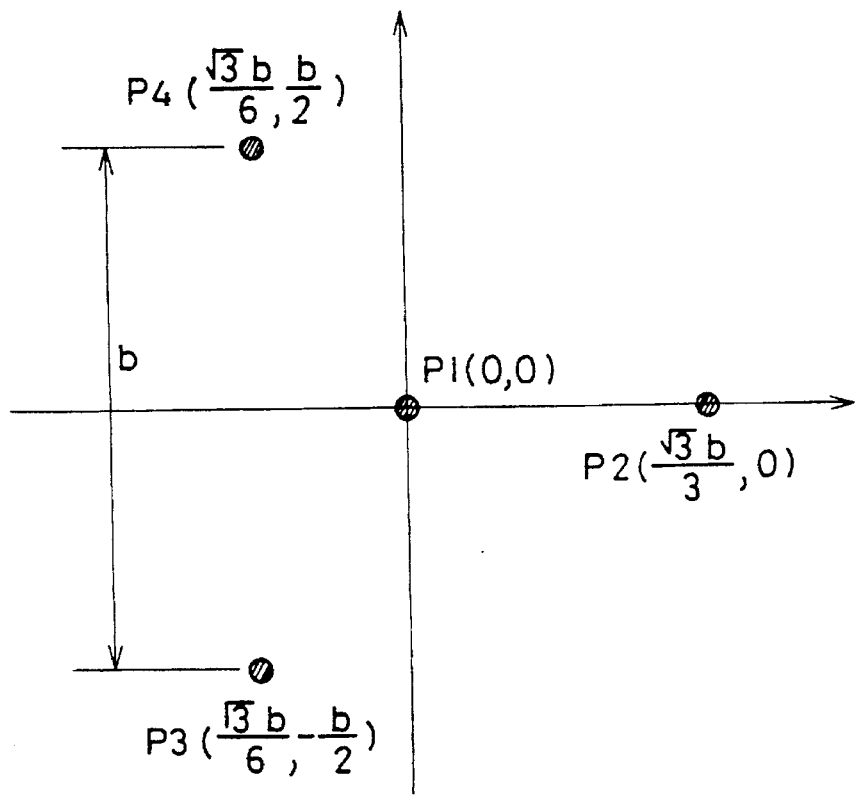
FIGS. 11A and 11B show a diagram exemplifying patterns of spot images formed by the embodiments of the present invention.
Figure 14:
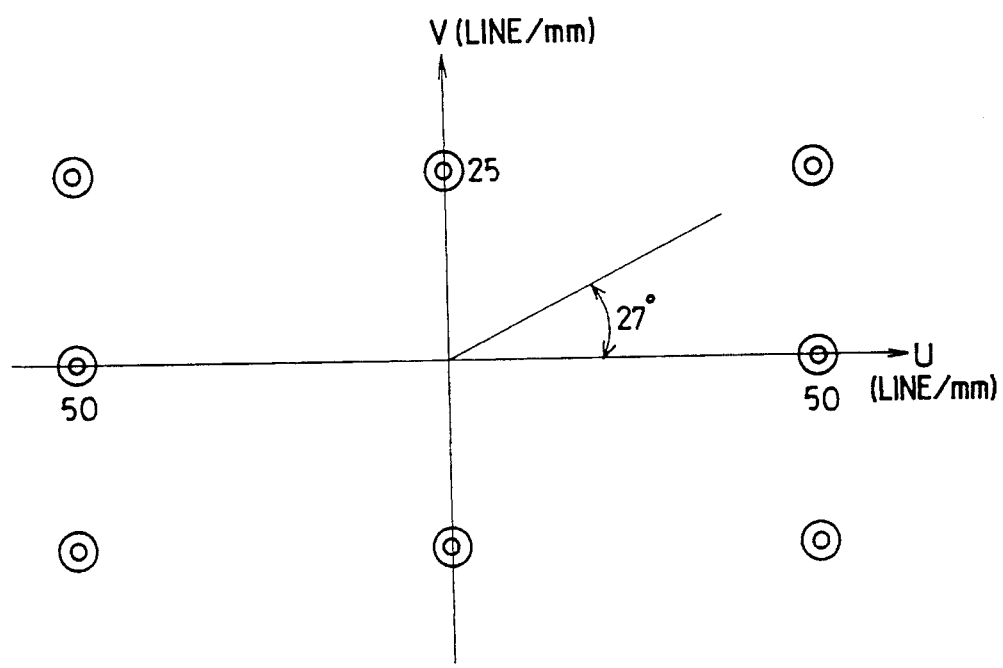
FIG. 14 shows a diagram illustrating points at which color beat is produced by the solid-state image pickup device shown in FIG. 13.
Figure 15:
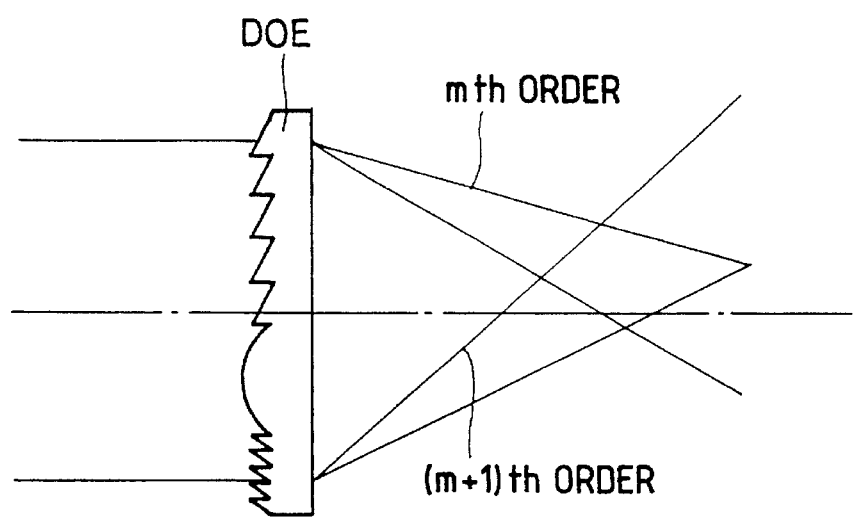
FIG. 15 shows a diagram illustrating a composition of a seventh embodiment of the optical low pass filter according to the present invention.

Various spot images which are unavailable with birefringent plates can be formed by disposing such diffractive optical elements in the vicinities of pupils of optical systems as in the cases of the embodiments of the present invention which are described above. The patterns of spot images shown in FIG. 11A, for example, give the MTF's illustrated in FIG. 12A, FIG. 12B, FIG. 12C and FIG. 12D. In FIG. 11A, b has a value of 0.03464 mm and light intensities on the spot images are equal to one another. FIG. 12A, FIG. 12B, FIG. 12C and FIG. 12D show MTF's in the horizontal direction, direction of 30°, direction of 60° and vertical direction respectively. Though the single-plate type solid-state image pickup device on which color filters are disposed in a mosaic patterns has color beat generating points in the two-dimensional space as shown in FIG. 14, the MTF characteristics shown in FIG. 12A, FIG. 12B, FIG. 12C and FIG. 12D eliminate the color beats in the horizontal direction and the vertical direction.

Figure 11B:
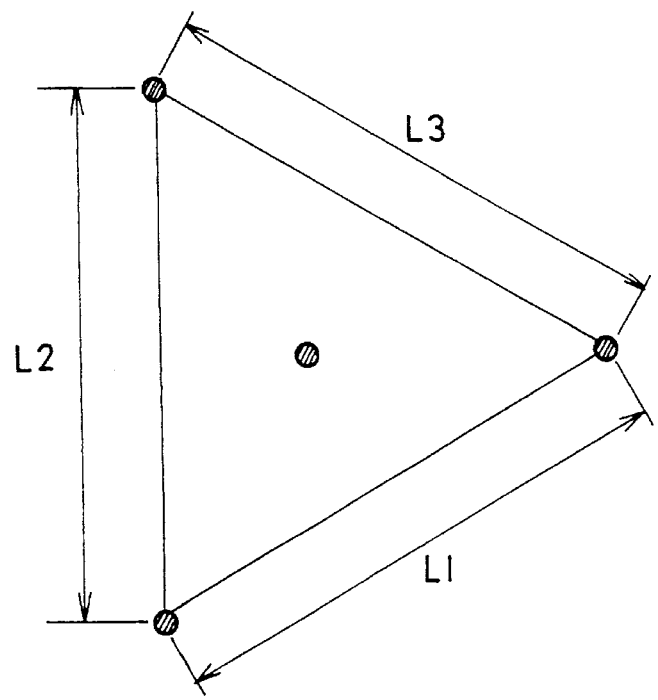
Figure 12A:
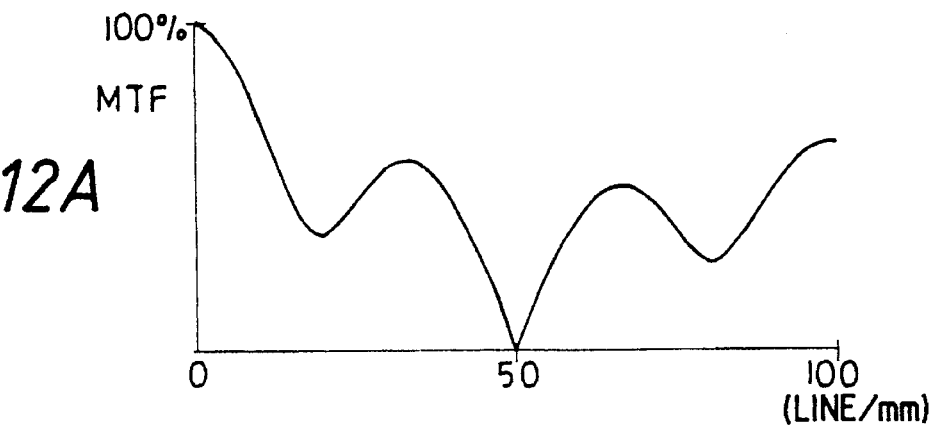
FIG. 12A through FIG. 12D show graphs illustrating MTF curves of the patterns shown in FIG. 11A.
Figure 12B:
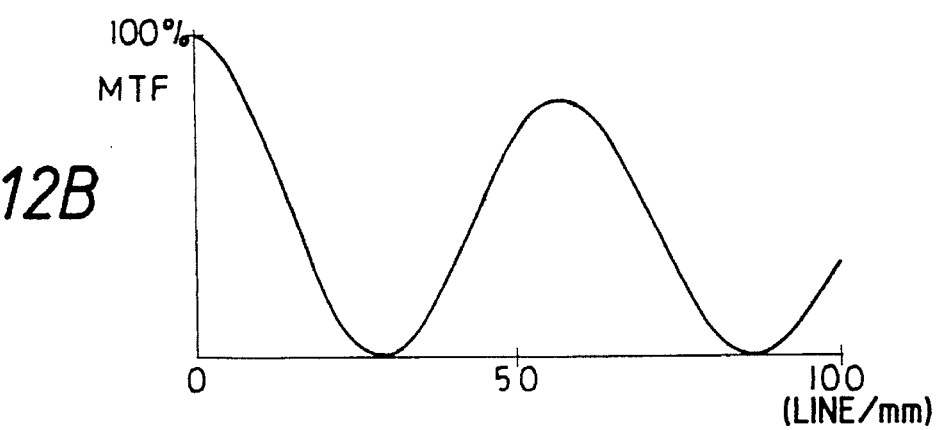
Figure 12C:
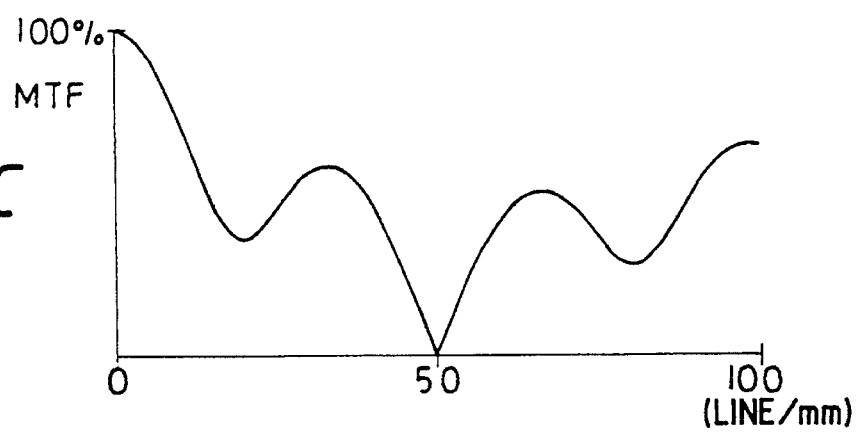
Figure 12D:
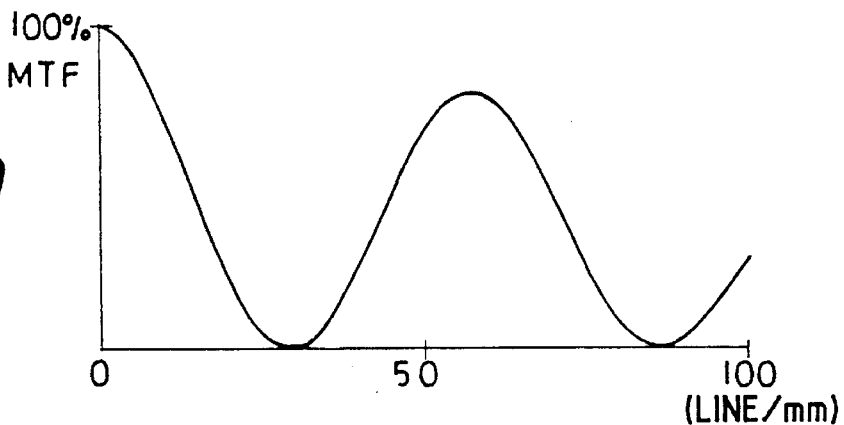

When spot images such as those shown in FIG. 11B are represented by $P_1$, $P_2$, $P_3$ and $P_4$ respectively, a center of gravity of the triangle is located at $P_1$, a distance between $P_2$ and $P_3$ is designated by $L_1$, a distance between $P_2$ and $P_3$ is designated by $L_2$, a distance between $P_2$ and $P_4$ is denoted by $L_3$, a groove pitch in the horizontal direction is represented by px, a groove pitch in the vertical direction is designated by py, and it is assumed that color difference signals are to be generated by using picture elements disposed in a number of n in the horizontal direction and in a number of m in the vertical direction, or in a total number of n×m, it is generally sufficient for eliminating the color beats to satisfy the conditions which are expressed by the following formulae (22) and (23):

$$\sqrt{3} \cdot n \cdot p_x = L_1 \text{ (or} = L_3) \tag{22}$$

$$m \cdot p_y = L_2 \tag{23}$$

Substantially, it is sufficient to satisfy the following relationship:

$$0.92 \cdot \sqrt{3} \cdot n \cdot p_x \leq L_1 \text{ (or} = L_3) \leq 1.09 \cdot \sqrt{3} \cdot n \cdot p_x$$

This relationship can be arranged into the following formula (24) which is to be satisfied for eliminating the color beats:

$$1.59 \cdot n \cdot p_x \leq L_1 \text{ (or} = L_3) \leq 1.09 \cdot \sqrt{3} \cdot n \cdot p_x \tag{24}$$

Similarly, it is sufficient for $L_2$ to satisfy a condition which is expressed by the following formula (25):

$$0.75 \cdot m \cdot p_y \leq L_2 \leq 1.4 \cdot m \cdot p_y \tag{25}$$

If one of $L_1$, $L_2$ and $L_3$ is not within the range defined by the condition specified therefor, the optical low pass filter has an MTF exceeding approximately 20% at the color beat generating points, thereby allowing moiré to be noticeable. However, n=m=1 is to be selected when color signals are to be generated by using a plurality of solid-state image pickup devices as in a case of a three-plate type camera or n and m are to be determined on a solid-state image pickup device adopted for generating color signals as in a case of a two-plate type camera.

Figure 13:
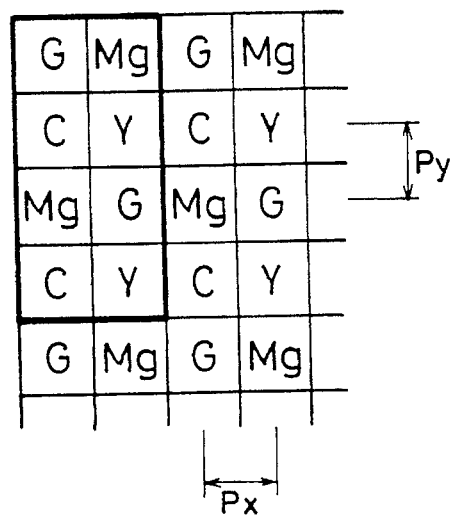
FIG. 13 shows a diagram illustrating an arrangement of color filters on the single-plate type solid-state image pickup device.

When a signal readout system which is configured so as to obtain color signals by mixing output signals from two picture elements disposed in the vertical direction, like the signal readout system disclosed by Japanese Patent Kokai Publication No. Sho 60-90,484, is used in the example illustrated in FIG. 13, two picture elements arranged in the horizontal direction and four picture elements arranged in the vertical direction within the range enclosed by the thick lines function as a unit for generating color signals, and we obtain n=2 and m=4.

Further, when an optical low pass filter which forms spot images illustrated in FIG. 11A or FIG. 11B is to be used in a TV camera for endoscopes, it is sufficient to set a cutoff frequency in each of the direction of 30° and the vertical direction so as to be the distance between the centers of the optical fibers on the image of the end surface or the optical image guide fiber bundle (distance between the optical fibers). It is therefore sufficient to select $L_2$ so as to satisfy a condition which is defined by the following equation (26):

$$\sqrt{3}/2 \cdot PF = L_2 \quad (26)$$

Substantially, it is sufficient to set $L_2$ within the range defined below:

$$0.75 \cdot \sqrt{3}/2 \cdot PF \leq L_2 \leq 1.4 \cdot \sqrt{3}/2 \cdot PF$$

Since the range mentioned above is arranged into the following condition (27), it is sufficient that $L_2$ satisfies the condition (27):

$$0.65 \cdot PF \leq L_2 \leq 1.21 \cdot PF \quad (27)$$

If $L_2$ is smaller than 0.65 PF or larger than 1.21 PF, the optical low pass filter has an MTF exceeding approximately 20% at a frequency of $$1/(0.75 \cdot \sqrt{3}/2 \cdot PF) \text{ or } 1/(1.4 \cdot \sqrt{3}/2 \cdot PF),$$

thereby being incapable of sufficiently attenuating a spatial frequency spectrum in the piling direction of optical fibers.

A composite type TV camera which outputs composites of luminance signals and color difference signals produces moving color moiré in directions of approximately ±30° in the two-dimensional frequency space due to color width frequency (3.58 megaheltz according to the NTSC standard). For eliminating such color moiré, it is desirable to set a cutoff frequency of the optical low pass filter at the color width carrier frequency. For this purpose, it is sufficient to establish relationship which is expressed by the following formula (28):

$$f_n = 1/L_1 \text{ (or } 1/L_3) \quad (28)$$

wherein the reference symbol $f_n$ represents a color subcarrier frequency which is expressed by the following formula (29) or (30):

$$f_n = 283/(2 \cdot V) \text{ (according to the NTSC standard)} \quad (29)$$

$$f_n = 350/(2 \cdot V) \text{ (according to the PAL standard)} \quad (30)$$

wherein the reference symbol V represents a vertical size (mm) of an imaging surface.

In this case also, it is sufficient that $L_1$ satisfies the following condition (31):

$$0.71 \cdot f_n \leq 1/L_1 \leq 1.33 \cdot f_n$$

or $$0.71 \cdot f_n \leq 1/L_3 \leq 1.33 \cdot f_n \quad (31)$$

If $1/L_1(L_3)$ is smaller than $0.71 \cdot f_n$ or larger than $1.33 \cdot f_n$, the optical low pass filter will have an MTF exceeding approximately 20%, thereby being incapable of sufficiently attenuation an MTF at the color subcarrier frequency.

The spot images described above may be modified in the shape thereof and the similar effect can be obtained even when spot images are formed in an increased number so long as spot images having such a shape are included in the spot images.

The seventh embodiment of the present invention also uses an eccentric diffractive optical element but is based on an operating principle which is slightly different from that of the first through sixth embodiments. Use of the eccentric diffractive optical element makes it possible to form a plurality of spot images by utilizing differences in focal length for rays having different numbers of orders. In this case, a requirement for obtaining a favorable function of the optical low pass filter is that image points for the rays having the different numbers of orders are not deviated from one another.

Figure 16A:
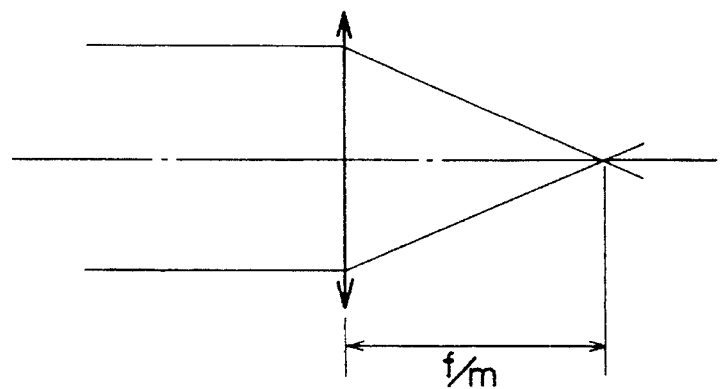
FIGS. 16A and 16B show diagrams illustrating an operating principle of the seventh embodiment of the present invention.
Figure 16B:
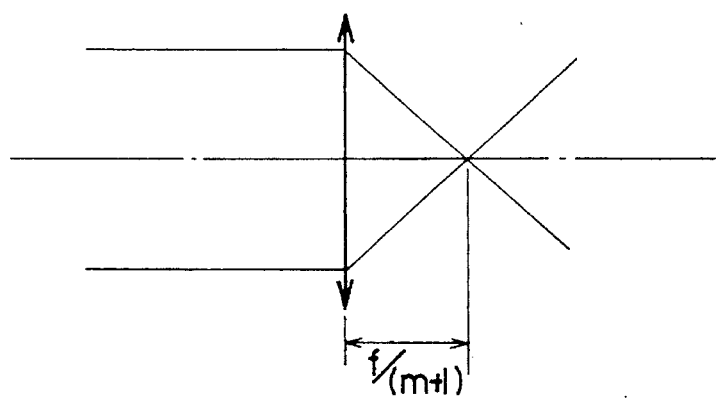
Figure 17A:
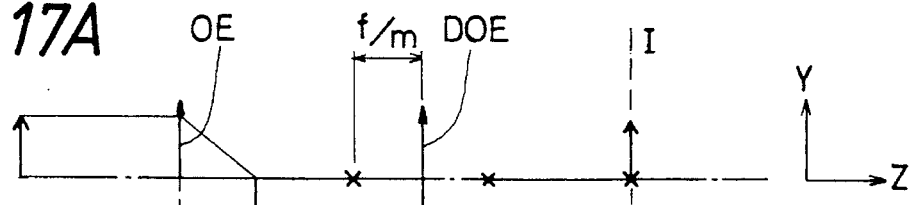
FIGS. 17A and 17B show diagrams illustrating the operating principle also of the seventh embodiment of the present invention.
Figure 17B:
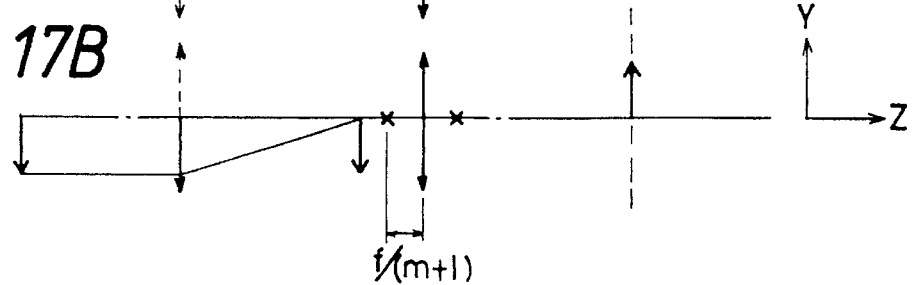

When attention is paid to a ray of m'th order (m: a natural number), the diffractive optical element has a focal length of f/m as shown in FIG. 16A. Further, let us pay attention to another ray having another number of order (m+1) and assume that the diffractive optical element has a focal length of f/(m+1) for this ray. In order that the rays having the different numbers of orders are imaged at the same location, these rays must be emitted from different object points. A condition where the rays having the different numbers of orders come from different object points can be set up, for example, by disposing an optical element OE having imaging functions different between the y direction and the −y direction on the object side of an eccentric diffractive optical element DOE as illustrated in FIGS. 17A and 17B. When the optical elements are disposed as described above, rays of plural numbers of orders form images at magnifications which are different dependently on the differences of focal lengths and are imaged at a constant location, whereby a combination of these optical elements has an effect of an optical low pass filter.

Though the optical element having imaging functions different between the y direction and the −y direction may be composed of diffractive lens elements, it is simpler to compose such an optical element of a diffractive optical element on which diffractive regions having imaging functions varying discontinuously.

The diffractive optical element functions most favorably as an optical low pass filter when it is used for separating a spot image into a plurality of spot images, but it can have a bandwidth limiting effect when it is used for limiting a diameter of a spot image to a certain length. When the diameter of the spot image is represented by $\phi$ in the latter case, an MTF of this spot image is a Fourier transform of the cylinder function and is expressed by the sombrero function:

$$Cyl(r/\phi) = \begin{cases} 1 (0 \leq r < \phi/2) \\ 1/2 (r = \phi/2) \\ 0 (r > \phi/2) \end{cases} \quad (32)$$

wherein $r = (x^2 + y^2)^{1/2}$ $$\text{somb}(\phi R) = 2 \cdot J_1(\pi \phi R)/(\pi \phi R) \quad (33)$$

wherein $R = (u^2 + v^2)^{1/2}$ and the reference symbol $J_1$ represents the Bessel function of the first kind.

The spot image expressed by the above-mentioned formula (33) has a cutoff frequency $f_c$ given by the following formula (34):

$$f_c = 1.22/\phi \quad (34)$$

In order that a diffractive optical element forming the spot images described above functions as an optical low pass filter when CCD's are disposed at a pitch of px in the horizontal direction and another pitch of py in the vertical direction, and picture elements are disposed in a number of n in the horizontal direction and in another number of m in the vertical direction (or in a total number of n×m), it is sufficient that the diameter of the spot images satisfy the condition shown below:

$$1/(m \cdot p_y) \leq 1.22/\phi \leq \{1/(n \cdot p_x)^2 + 1/(m \cdot p_y)^2\}^{1/2}$$

This condition can be arranged into the following condition (35):

$$0.82/(m \cdot p_y) \leq 1/\phi \leq 0.82 \cdot \{1/(n \cdot p_x)^2 + 1/(m \cdot p_y)^2\}^{1/2} \quad (35)$$

If $1/\phi$ is smaller than $0.82/(m \cdot py)$, $F_c$ zeroes an MT7 at a nearest color beat generating point. If $1/\phi$ is larger than $0.82\{1/(n \cdot p_x)^2 + 1/(m \cdot p_y)^2\}^{1/2}$, $F_c$ zeroes an MTF at a farthest color beat generating point on an assumption that $n=m=1$ is selected when color difference signals are generated by a plurality of solid-state image pickup devices as in case of a three-plate type camera or n and m are determined on a solid-state image pickup device adopted for generating color difference signals as in case of a two-plate type camera.

However, a value of a spatial frequency at which somb ($\phi R$) is 20% is expressed by the following formula (36):

$$u = 0.96/\phi \quad (36)$$

Accordingly, the formula (35) can substantially be replaced with the following condition (37):

$$1/\phi \leq 1.04\{1/(n \cdot p_x)^2 + 1/(m \cdot p_y)^2\}^{1/2} \quad (37)$$

In a case where moiré is to be eliminated favorably in particular, somb($\phi R$) should be controlled so as to be 10% or lower. A spatial frequency at which somb($\phi R$) is 10% or lower exists within a range defined by the following formula (38):

$$1.06/\phi \leq u \leq 1.46/\phi \quad (38)$$

Hence, it is sufficient that the formula (36) satisfies the condition (39) shown below as judged from the following formulae (A) and (B):

$$1/(m \cdot p_y) \leq 1.46/\phi \quad (A)$$

$$1.06/\phi \leq \{1/(n \cdot p_x)^2 + 1/(m \cdot p_y)^2\}^{1/2} \quad (B)$$

$$0.68/(m \cdot p_y) \leq 1/\phi \leq 0.94\{1/(n \cdot p_x)^2 + 1/(m \cdot p_y)^2\}^{1/2} \quad (39)$$

For using such an optical low pass filter in a TV camera for endoscopes, it is sufficient that s distance between centers of optical fibers on an image of an end surface of an optical image guide fiber (distance between optical fibers) satisfies the following condition (40):

$$1/\phi \leq 1.04 \cdot 2/(\sqrt{3} \cdot PF) \text{ or } 1/\phi \leq 1.2/PF \quad (40)$$

The condition (40) is required for allowing somb($\phi R$) to be 20% or lower, whereas the following condition (41) must be satisfied for lowering somb($\phi R$) to 10% or lower:

$$0.68 \cdot 2/(\sqrt{3} \cdot PF) \leq 1/\phi \leq 0.94 \cdot 2/(\sqrt{3} \cdot PF) \text{ or} \quad (41)$$

$$0.79/PF \leq 1/\phi \leq 1.09/PF$$

Actually, spatial frequency spectra produced in directions of ±30° and ±90° in the two-dimensional frequency space by bright portions and dark portions which are produced due to the cores and claddings of the optical fibers. Since these frequency spectra and the frequency generated at the beat generating points of the solid-state image pickup devices can be rotated relatively to the optical fibers so as to prevent the interference between the frequency spectra and the frequency, the strict condition (40) or (41) is unnecessary and it is sufficient to satisfy the following condition (42):

$$1/\phi \leq 2/PF \quad (42)$$

If $1/\phi$ is larger than 2/PF, a core diameter will be shorter than a cladding diameter and the frequency spectrum in the vertical direction will have a higher intensity, thereby making it impossible to prevent between the frequency spectrum and the color beat generating points of the solid-state image pickup devices.

When a diffractive optical element is to be used as an optical low pass filter described above, the diffractive regions having the imaging functions need not vary discontinuously since the spot diameter serves for disturbing a wave surface so as to satisfy the above-mentioned condition. Further, a similar effect is obtainable even when the spot is not correctly circular but slightly deformed.

It is desirable that the optical low pass filters preferred as the embodiments of the present invention described above are disposed in the vicinities of pupils of optical system for endoscopes. In particular cases where the optical low pass filters are to be used in TV cameras which can be externally equipped with endoscopes permitting observations by maked eyes as exemplified in FIG. 26, it is desirable to dispose the optical low pass filters in the vicinities of pupils of optical systems (eyepiece optical systems) for endoscopes.

Figure 18A:
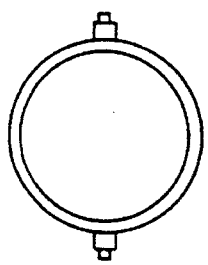
FIGS. 18A through 18D show sectional views an optical system using the optical low pass filter according to the present invention which is configured so as to permit exchanging diffractive optical elements.
Figure 18B:
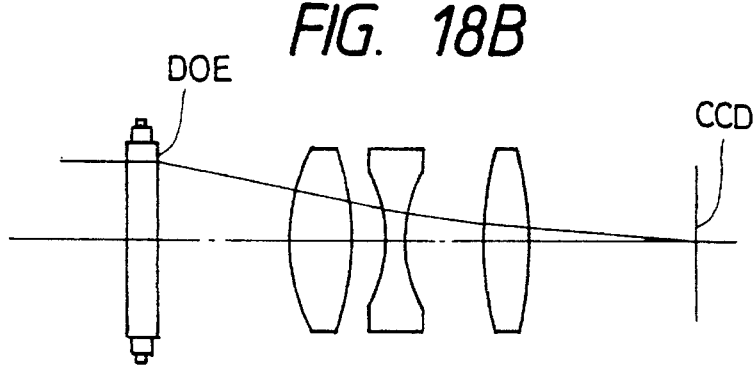
Figure 18C:
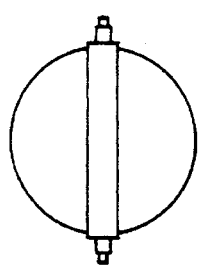
Figure 18D:
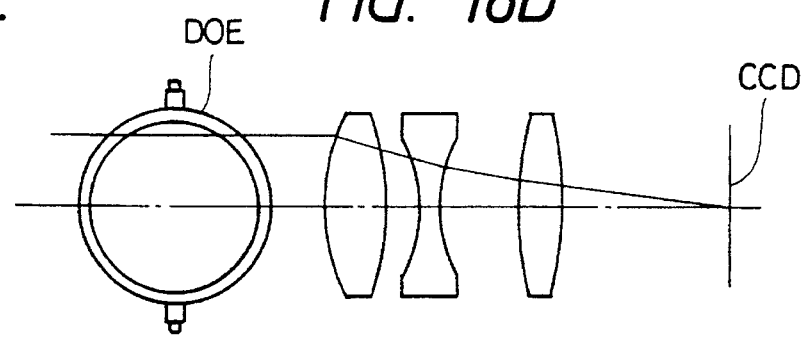

The optical low pass filter described above degrades an MTF due to the function thereof to prevent moiré and such degradation of the MTF may be undesirable for certain kinds of objects to be observed. FIGS. 18A and 18B illustrate an imaging lens system which is configured so as to turn a diffractive optical element set for the above-described spot diameter in accordance with types of objects to be observed. Speaking concretely, this imaging lens system permits locating a diffractive optical element in an imaging optical path for observing an object producing moiré as shown in FIG. 18A and turning the diffractive optical element so as not to lower contrast for observing an object which does not produce moiré and is not suited for observation with low contrast as shown in FIG. 18B.

Utilized in this case is a function of the diffractive optical element as a plate lens element (a plane parallel plate having an optical power). However, such an imaging lens system having the composition described above can be composed by displacing an imaging location with a glass plate, for example, instead of the diffractive optical element or a phase filter.

Since an optical low pass filter such as that shown in FIG. 18A and FIG. 18B has nearly no optical power, the function thereof for disturbing a wave surface means in this case a function to produce chromatic aberration in an amount which cannot be sensed by a solid-state image pickup device. Since production of moiré is largely influenced due to luminance signals generated from rays having green wavelengths, the optical low pass filter can exhibit a remarkable effect when chromatic aberration is produced within the bandwidth of green.

Figure 19A:
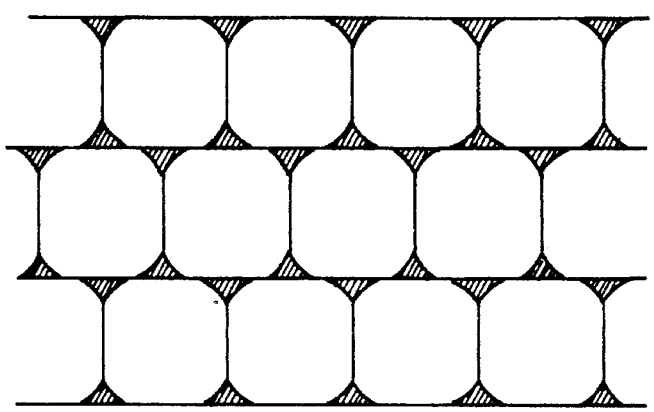
FIGS. 19A and 19B show a composition of an optical low pass filter which uses micro lens arrays.
Figure 19B:
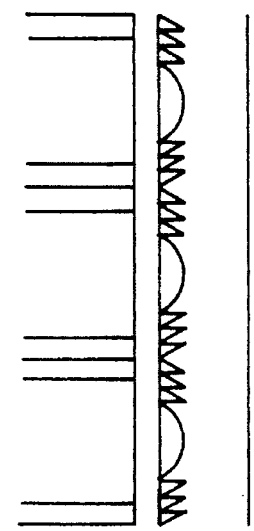
Figure 20:
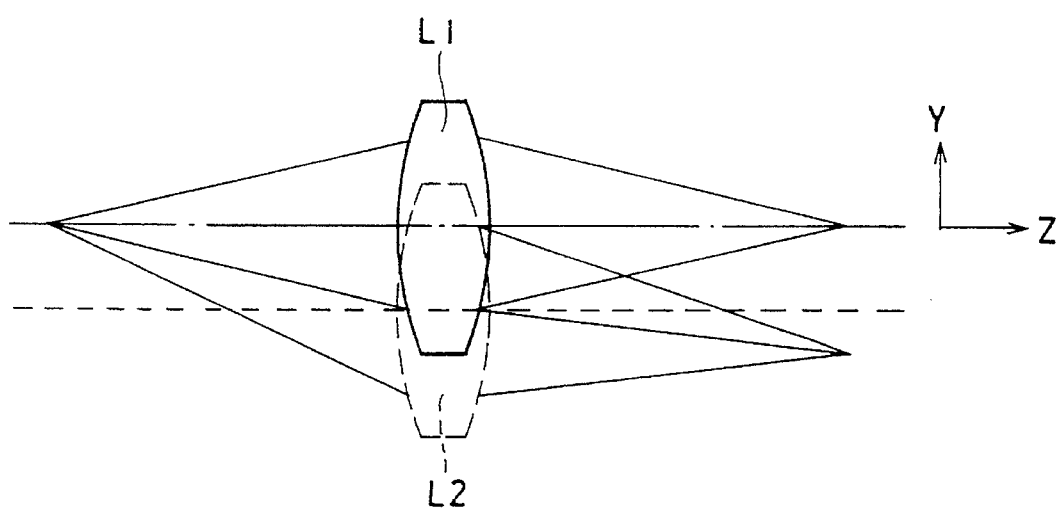
FIG. 20 shows a sectional view illustrating an imaging function of a lens system composed of two lens elements one of which is made eccentric according to the principle of the present invention.
Figure 22A:
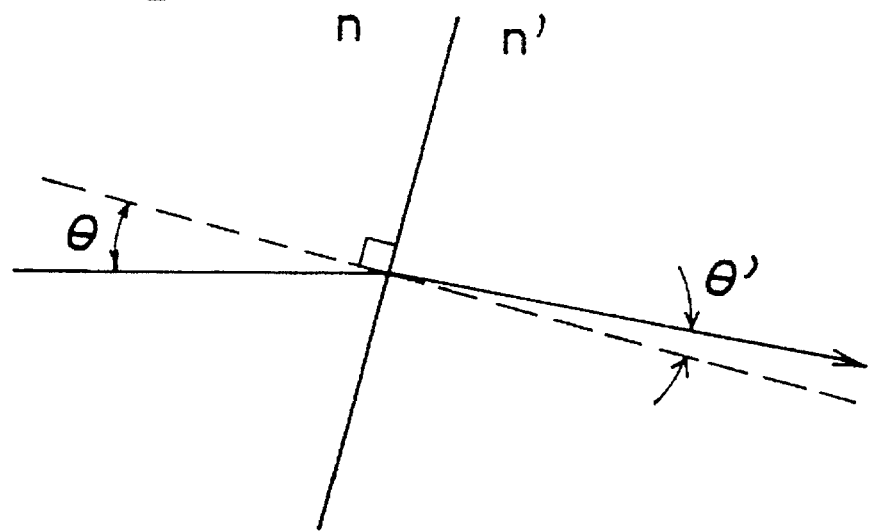
FIGS. 22A and 22B show diagrams illustrating refraction and diffraction of rays by a refractive optical system and a diffractive optical system respectively.
Figure 22B:
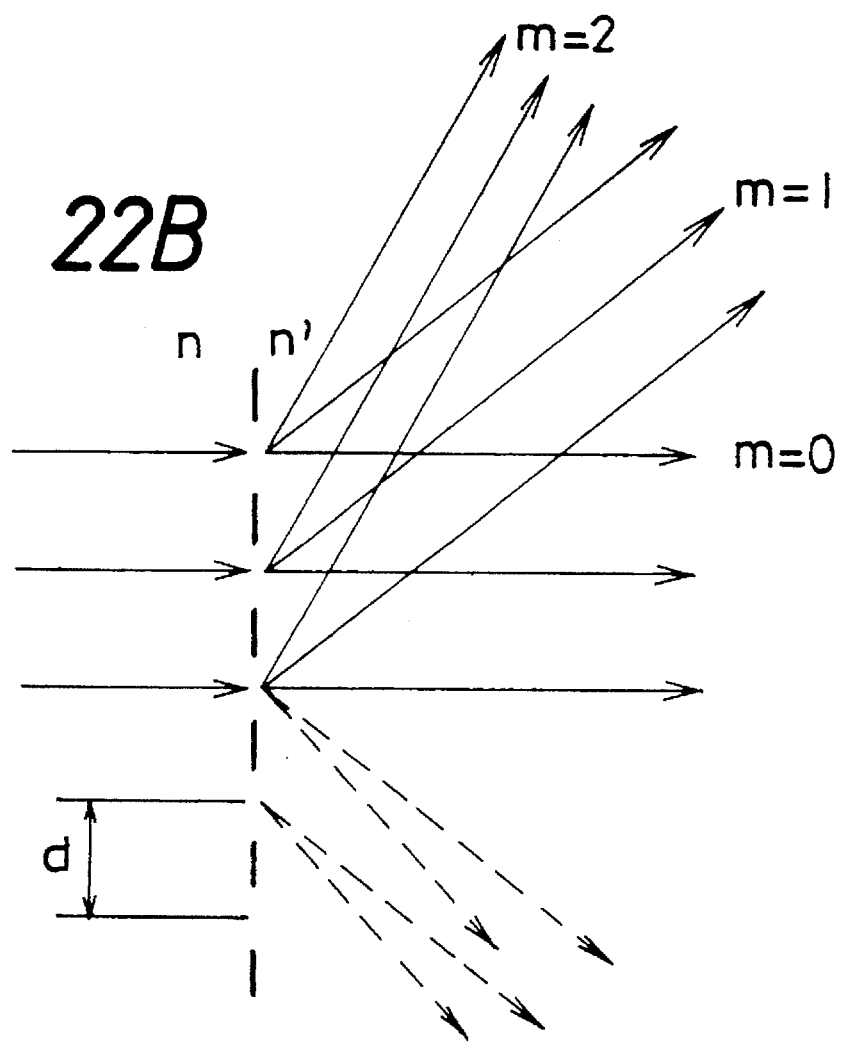
Figure 25:
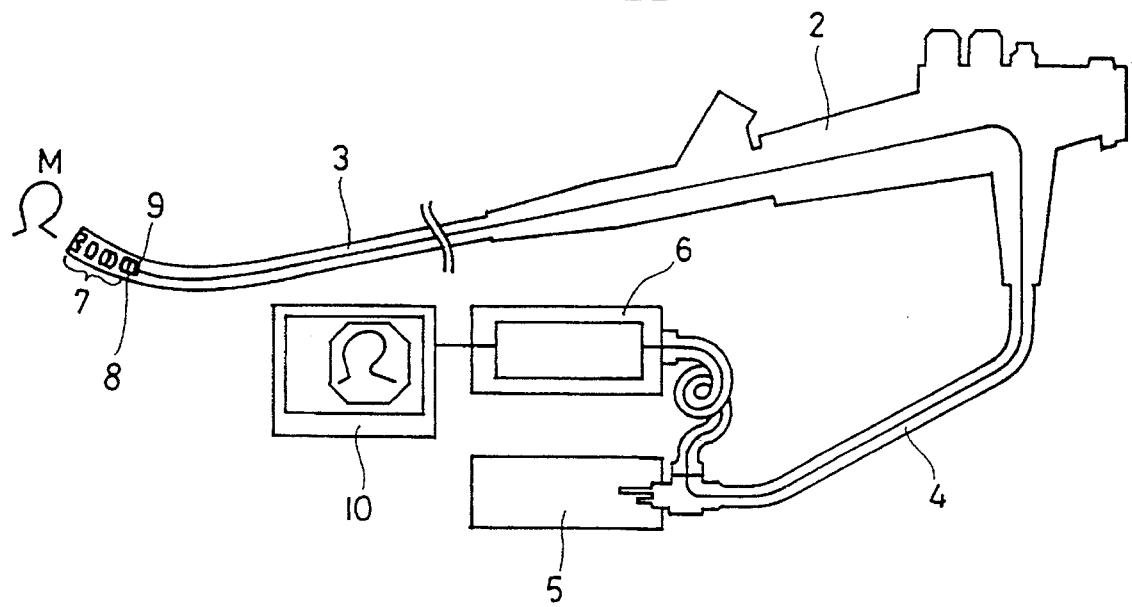
FIG. 25 shows a sectional view illustrating a configuration of an electronic endoscope.
Figure 26:
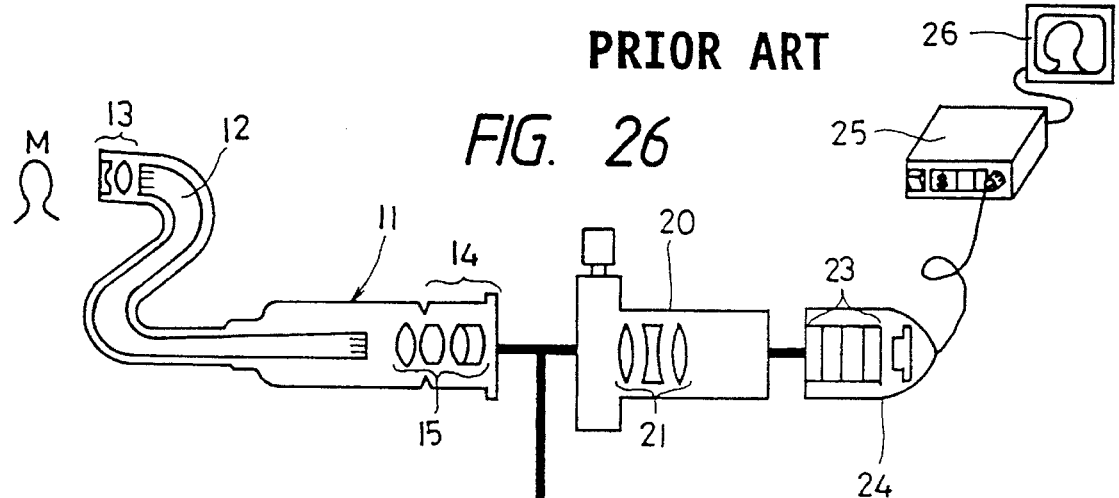
FIG. 26 shows a sectional view illustrating a combination of a fiber scope or a non-flexible endoscope and an electronic imaging apparatus.
Figure 26:
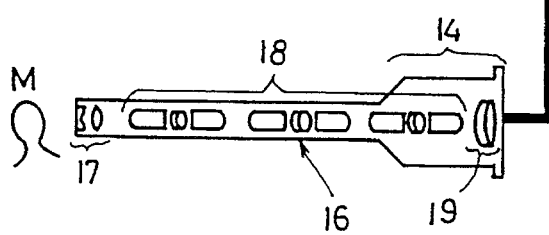
Figure 27:
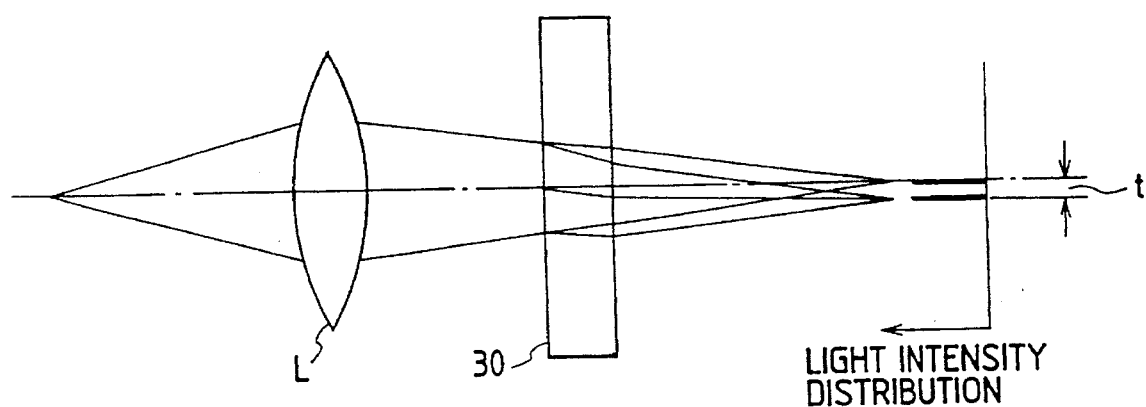
FIG. 27 shows a sectional view illustrating an optical system which is configured so as to limit a spatial frequency bandwidth by using a birefringent plate.
Figure 28:
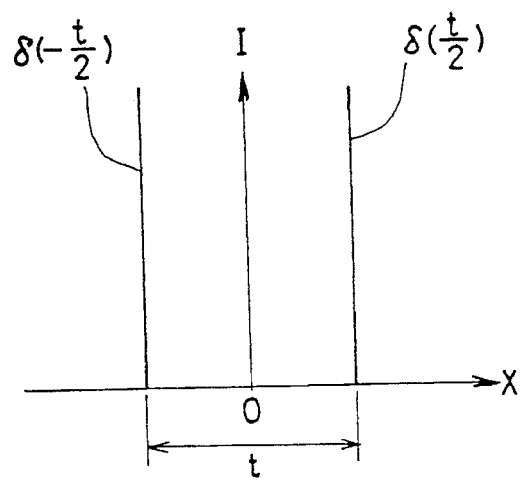
FIG. 28 shows a graph illustrating a light intensity distribution on a spot image formed by the optical system shown in FIG. 27.
Figure 30A:
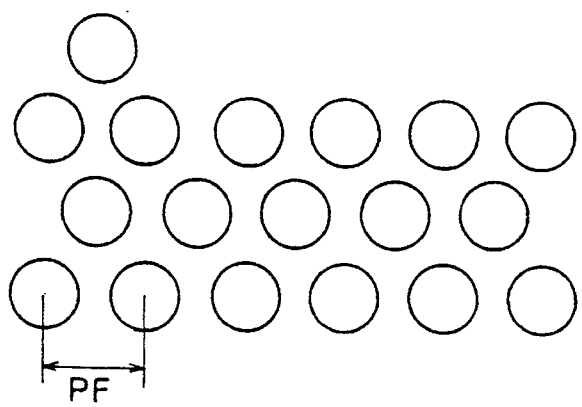
FIGS. 30A and 30B show a diagram illustrating an end surface of emergence of an optical fiber bundle.
Figure 30B:
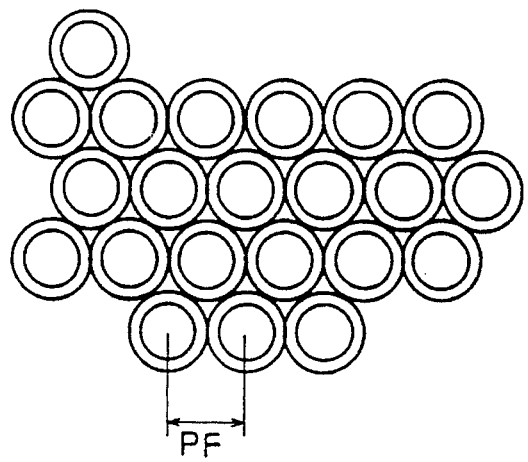

It is conceivable to use micro lens arrays as an optical low pass filter. In case of a TV camera equipped with an external endoscope as shown in FIG. 26 for observing an end surface of a fiber scope, highly intense frequency spectra are produced in the piling directions of the optical fibers, and moiré is produced due to interference between the frequency spectra and picture elements regularly disposed on a solid-state image pickup device. When micro lens arrays are bonded to the end surface of the fiber scope, the cores of the optical fibers are magnified as shown in FIG. 19A and portions of the claddings are not observed on an image of such an object as shown in FIG. 30A. In other words, the frequency spectra produced due to repeating of the cores and claddings are eliminated from the image of the object, thereby preventing moiré from being produced. Though the micro lens arrays may be of any type, it is necessary to limit magnifications β of the micro lenses within a range defined by the following condition (43) in optical imaging relationship thereof:

$$1 < \beta \le 2 \cdot \phi_2/(\sqrt{3} \cdot \phi_1) \tag{43}$$

$$1 < \beta \le 1.15 \cdot \phi_2/\phi_1$$

wherein the reference $\phi_1$ represent a diameter of the core the reference $\phi_2$ represent a diameter of claddings.

If β has a value larger than 1, the micro lens arrays will be incapable of performing the role to eliminate the frequency spectra. If β has a value larger than $1.15\phi_2/\phi_1$, images of the cores will undesirable be magnified so as to be larger than those of the claddings- Though there is known a conventional optical low pass filter in which a micro lenses array is disposed immediately before a solid-state image pickup device for obtaining an effect of an optical low pass filter, this optical low pass filter uses the micro lenses each of which is bonded so as to correspond to two picture elements in refractive optical system and can hardly exhibit an effect which is so much complicated.

In contrast, use of micro lenses which use diffractive optical elements makes it possible to obtain complicated effects of optical low pass filters.

Now, description will be made of another use of diffractive optical elements. For observing an object through the ordinary endoscope which requires tedious focusing operations during an inspection or medical operation and does not permit reserving a space for disposing a focusing mechanism, a distance as measured from a leading end of the endoscope to an object to be observed must be adjusted until the object is located within a range where it is in focus (within a depth of field). However, the depth of field is approximately 2 mm to 50 mm, or not so long, and it is not easy to adjust the distance as measured from the leading end of the endoscope to the object. For this reason, it is desired to use pan-focus type endoscopes which have very long depths of field. Use of the diffractive optical elements makes it easy to manufacture such pan-focus type endoscopes.

The diffractive optical elements have dispersing characteristics which are described below:

Relationship expressed by the following formula applies to a thin lens element using such a diffractive optical element:

$$1/f = (n-1)(1/r_1 - 1/r_2)$$

wherein the reference symbol f represents a focal length of the thin lens element, the reference symbols $r_1$ and $r_2$ designate radii of curvature on a surface of incidence and a surface of emergence respectively of the thin lens element, and the reference symbol n denotes a refractive index of the thin lens element.

When both the sides of the above-mentioned formula are differentiated by a wavelength of λ, we obtain the following formula (44):

$$df/d\lambda = -f(dn/d\lambda)/(n-1)$$

$$\Delta f = -f\{\Delta n/(n-1)\} \tag{44}$$

Since λf is constant, (con.), for the diffractive optical element, f is equal to (con.)/λ. When both the sides of f=(con.)/λ are differentiated by λ, we obtained the formula (45) shown below by the following calculation:

$$df/d\lambda = -(\text{con.})/\lambda^2 = -f/\lambda \tag{45}$$

Since Δn/(n−1) is equal to ν, we obtain ν=λ/Δ. Hence, the diffractive optical element has $\nu_d$ which is expressed by the following formula (46):

$$\nu_d = \lambda_d/(\lambda_F - \lambda_C) = -3.453 \tag{46}$$

As is understood from the foregoing description, the diffractive optical element has a strongly negative dispersing characteristic and has a focal length which is varied dependently on wavelengths.

Figure 31A:
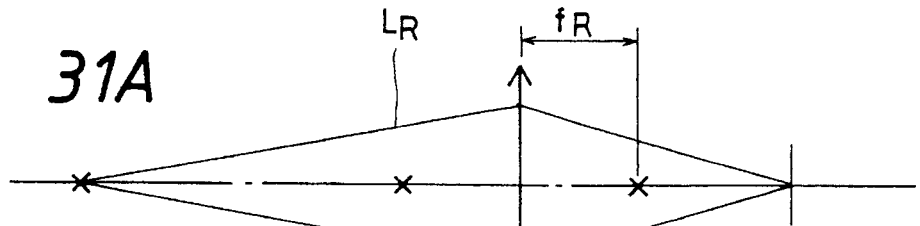
FIGS. 31A through 31C show diagrams illustrating a principle of a pan-focus image pickup device as another example of application of the diffractive optical element.
Figure 31B:
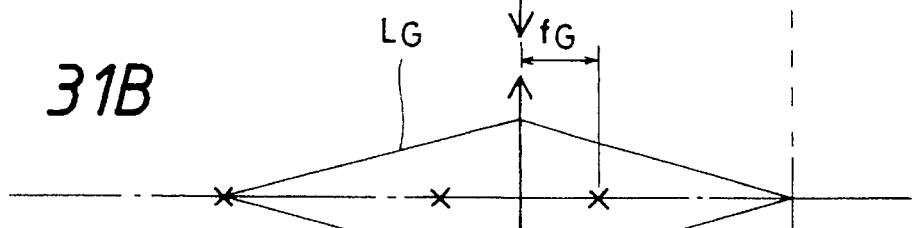
Figure 31C:
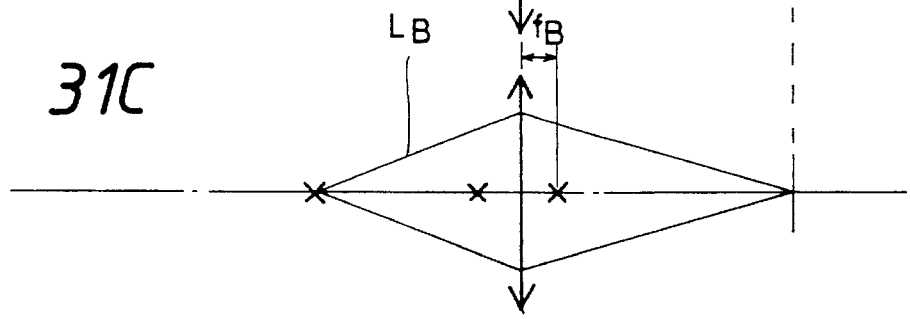

The pan-focus mode imaging is made applicable to endoscopes by imaging rays having long wavelengths (red components) and rays having short wavelengths (blue components) at the same location as illustrated in FIG. 31A, FIG. 31B and FIG. 31C. That is to say, it is sufficient for performing the pan-focus mode imaging to image, onto substantially the same location, a ray $L_R$ out of rays coming from an object point located at a long distance shown in FIG. 31A and another ray $L_B$ out of rays coming from an object point located at a short distance shown in FIG. 31C. By utilizing the principle described above, it is possible to perform focus adjustment by changing wavelengths of rays emitted from a light source. In a case where it is impossible to continuously change the wavelengths of the rays emitted from the light source, focus adjustment can be performed by configuring an imaging optical system so as to have a depth of field which can cover both the objects points located at the long distance and the short distance. The pan-focus mode imaging optical system is applicable not only to endoscopes but also monitor cameras and so on.

Figure 32A:
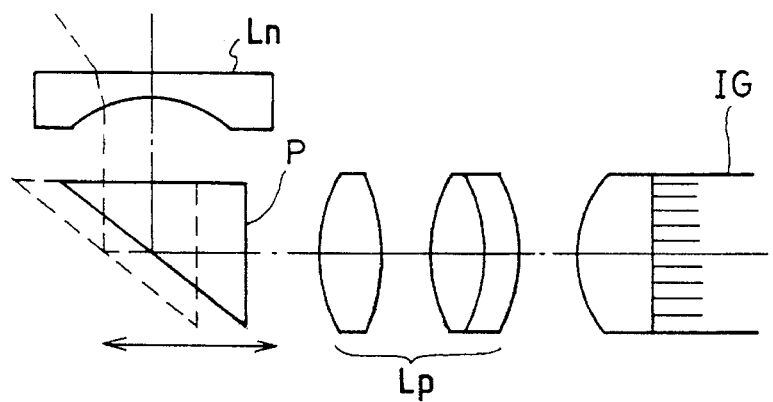
FIGS. 32A and 32B show sectional views illustrating a principle of a viewing direction changing optical system as still another example of application of the diffractive optical element.
Figure 32B:
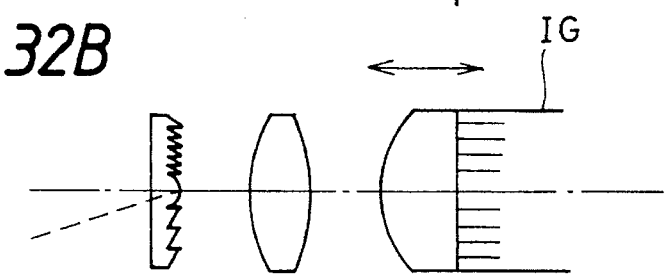
Figure 35:
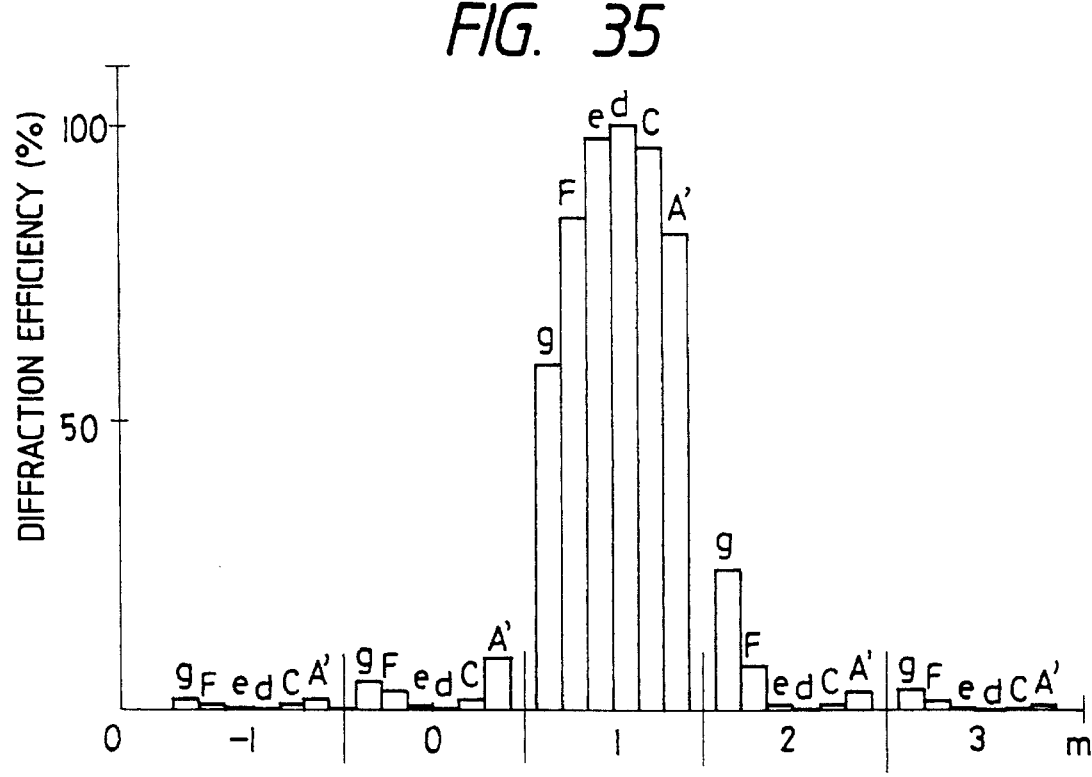
FIG. 35 shows a diagram illustrating diffraction efficiencies at various wavelengths.
Figure 37:
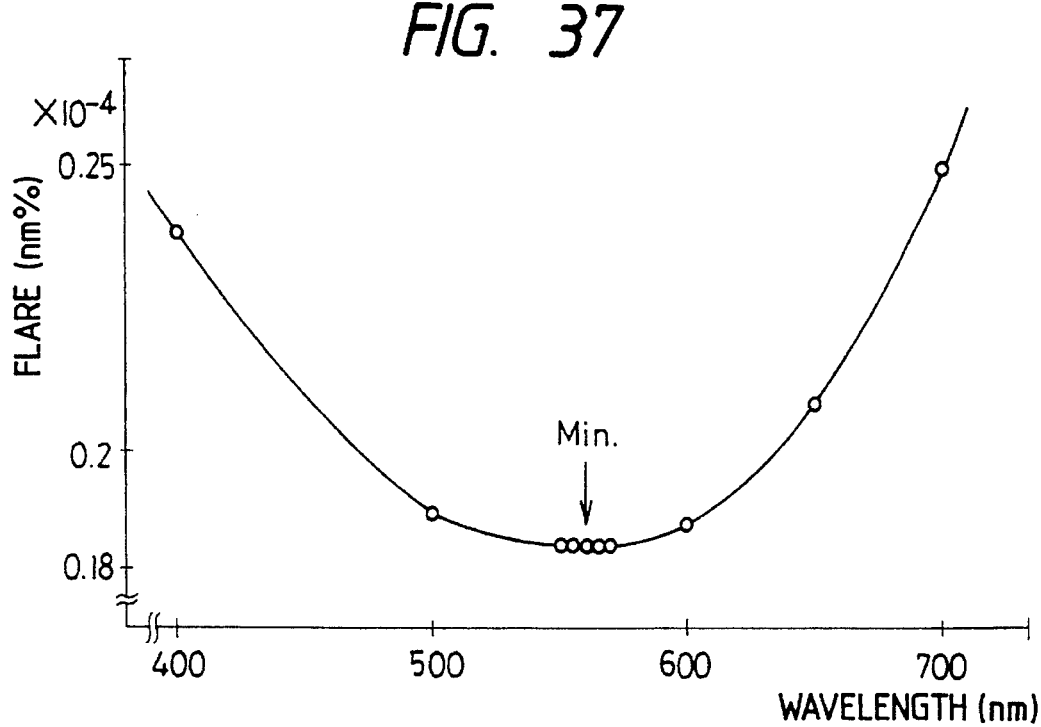
FIG. 37 shows a graph illustrating ratios of flare to be produced by a diffractive optical element at various wavelengths.
Figure 36A:
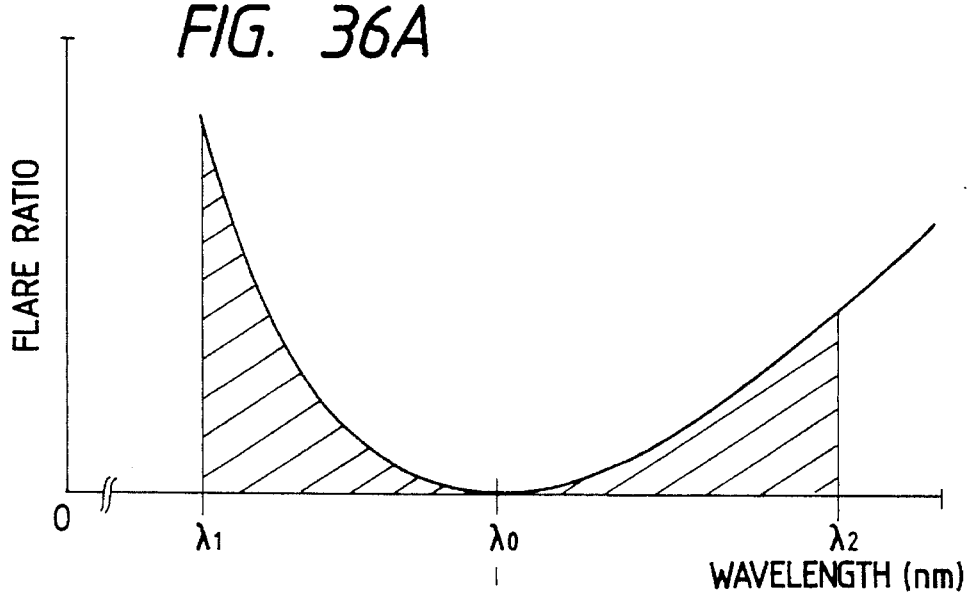
FIGS. 36A through 36C show conceptional diagrams illustrating ratios of flare to be produced by diffractive optical elements at various wavelengths.
Figure 36B:
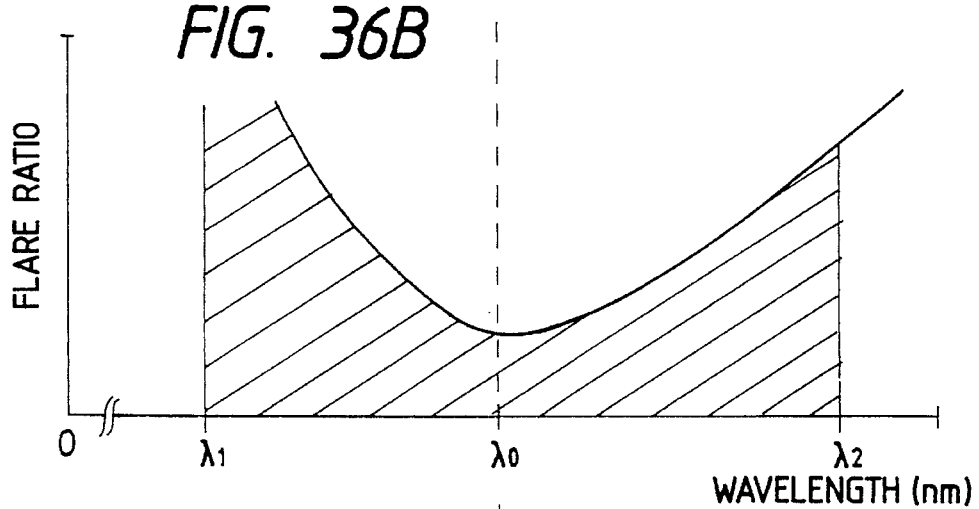
Figure 36C:
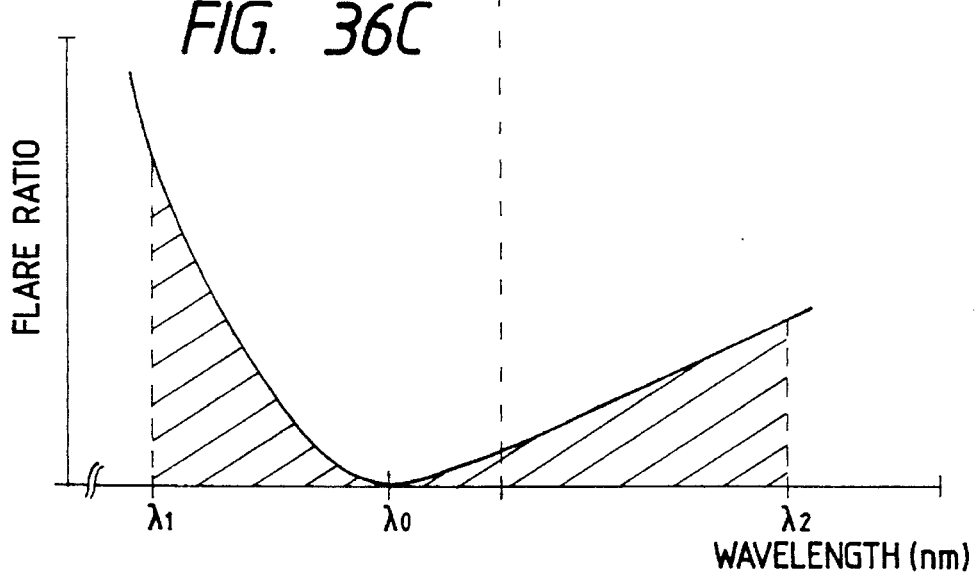
Figure 38:
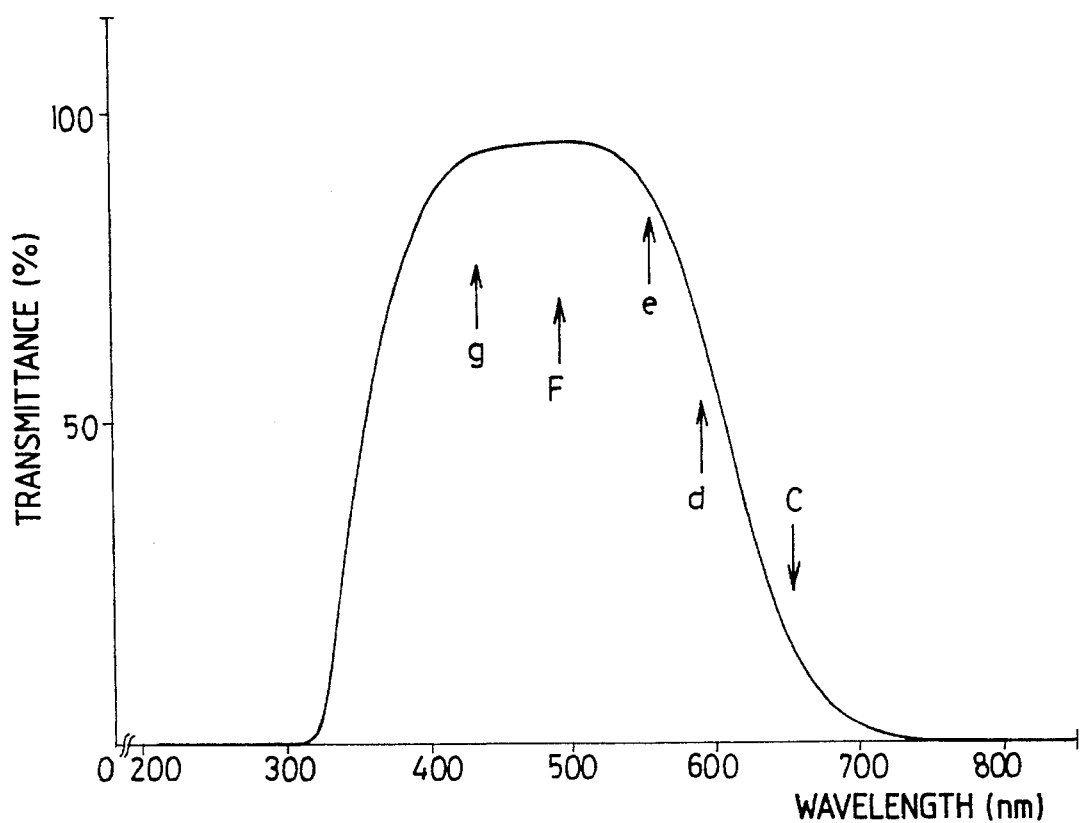
FIG. 38 shows a graph illustrating a spectral transmittance characteristic of an infrared cutoff filter.
Figure 39:
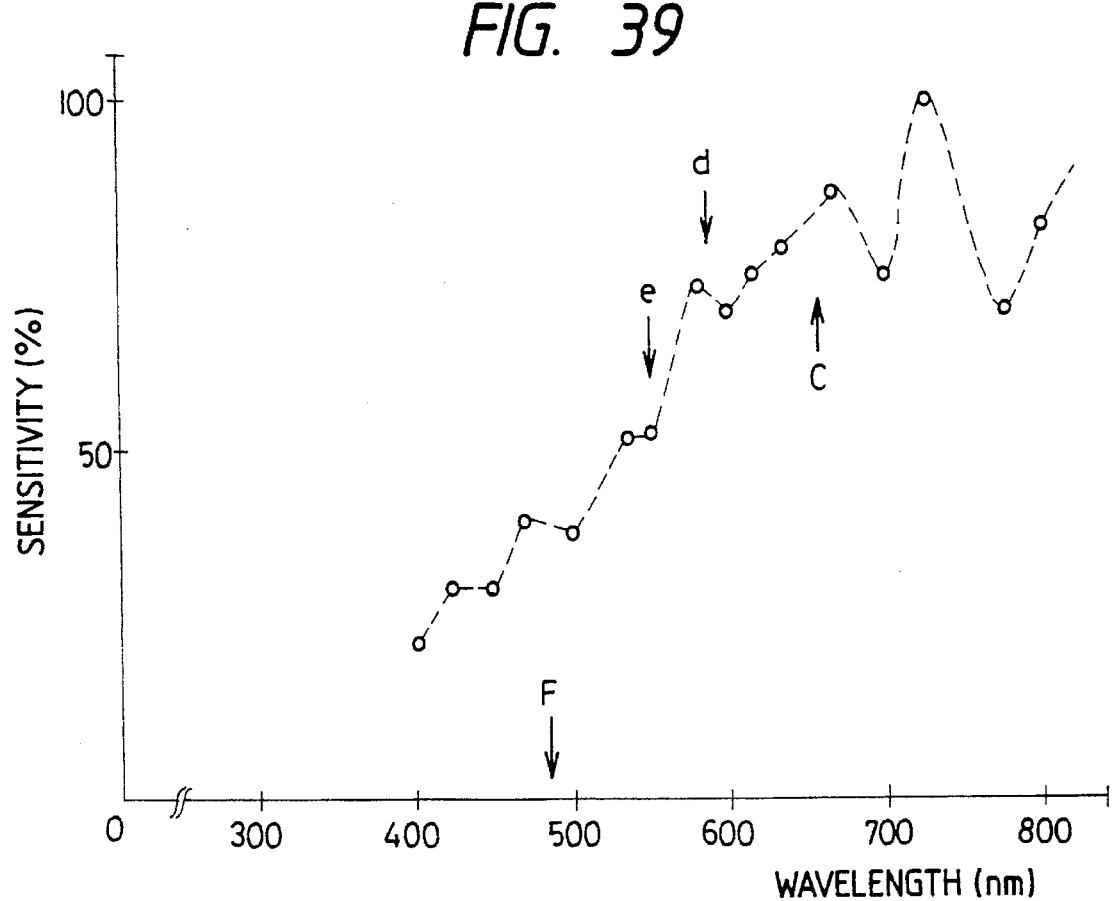
FIG. 39 shows a graph illustrating spectral sensitivity characteristic of a solid-state image pickup device.
Figure 40:
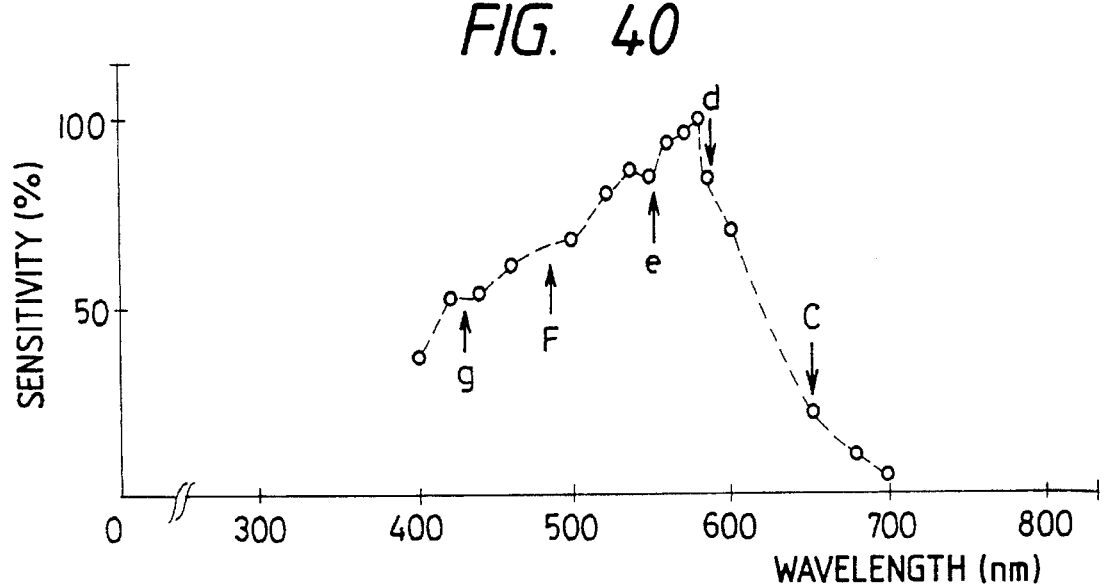
FIG. 40 shows a graph illustrating a total spectral sensitivity characteristic of the infrared cutoff filter shown in FIG. 38 and the solid-state image pickup device shown in FIG. 39.
Figure 41A:
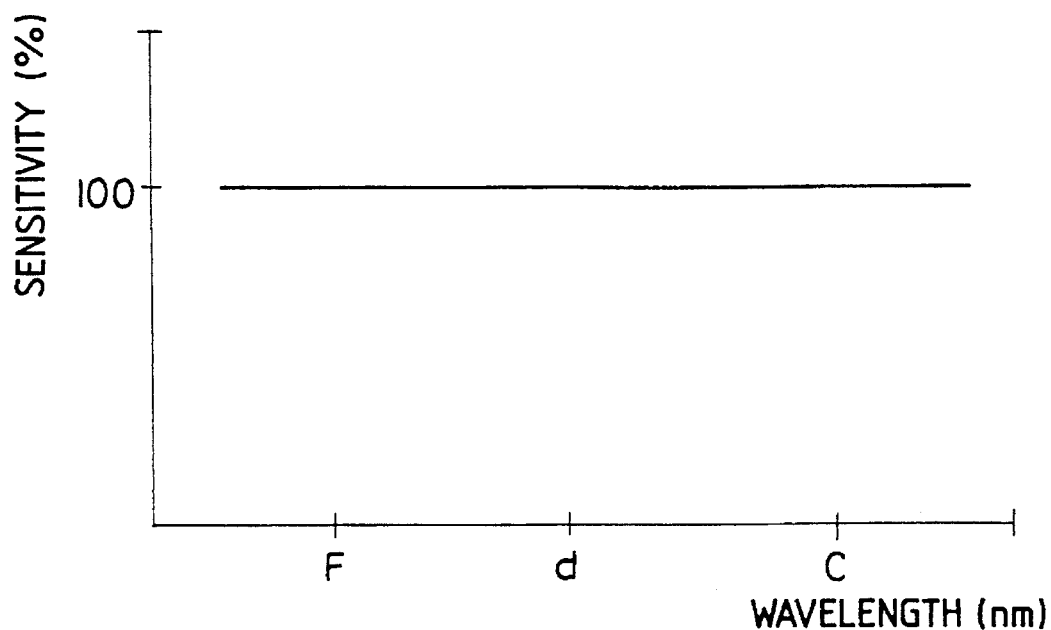
FIGS. 41A and 41B show graphs illustrating sensitivity characteristics for images formed by endoscopes.
Figure 41B:
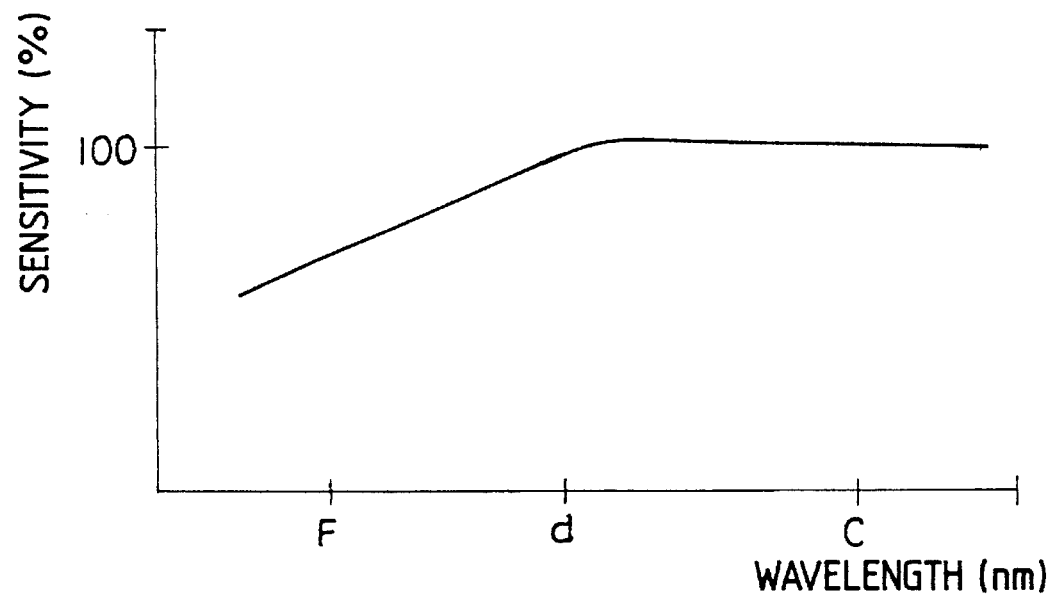
Figure 42A:
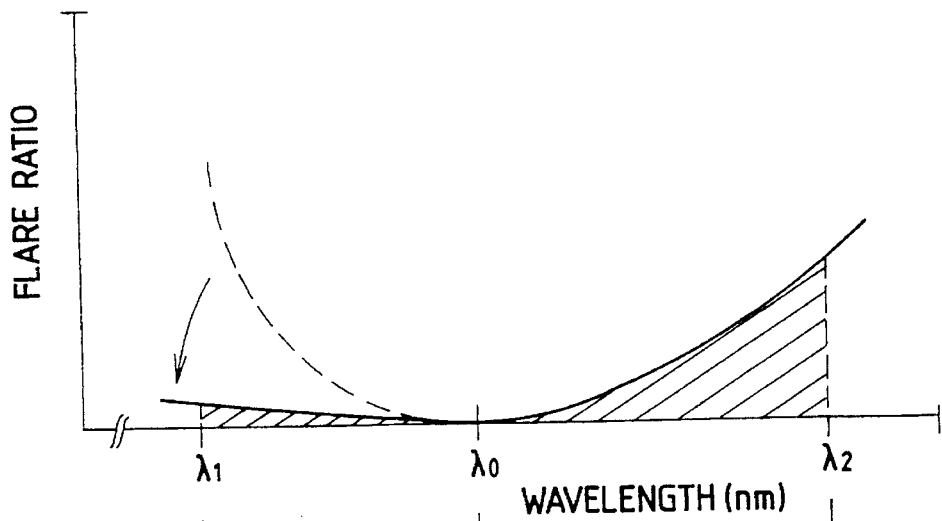
FIGS. 42A and 42B show conceptional diagrams illustrating flare in weighed conditions.
Figure 42B:
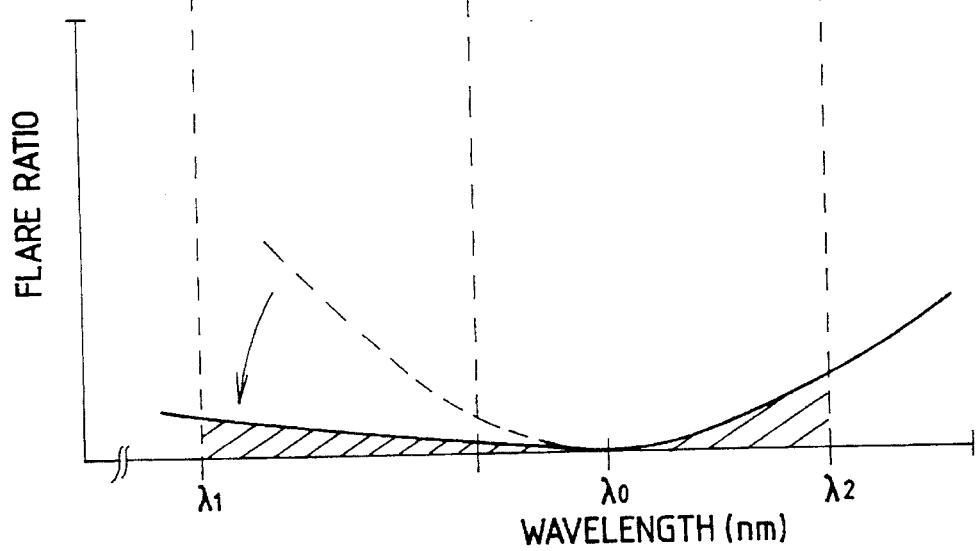

Further, there is known an endoscope which comprises a prism P or the similar member disposed between a negative lens element $L_n$ and a positive lens group $L_p$, and is configured so as to permit changing a direction toward a visual field thereof by moving the prism in directions indicated by arrows shown in FIG. 32A and FIG. 32B. However, this endoscope requires complicated mechanism for moving the prism, uses an inserting portion having a large diameter and has a composition undesirable for endoscopes. Use of a diffractive optical element in this visual field changing endoscope is preferable for making it compatible with an inserting portion having a small diameter. Speaking concretely, a ray incident on the diffractive optical element is divided into rays having different numbers of orders and these rays emerge from the diffractive optical element at different angles. Since the rays having the different numbers of orders are imaged at different locations, it is possible to compose a visual field changing optical system by utilizing the different imaging locations. Such an optical system makes it possible to change visual fields by moving an end surface of incidence of an optical image guide IG in the directions indicated by the arrows as shown in FIG. 32B.

The optical low pass filter according to the present invention can be manufactured at a low cost without using expensive birefringent plates owing to a fact that the effect of the optical low pass filter is obtained by using a diffractive optical element which has a plurality of diffractive regions having different and discontinuous imaging characteristics or is set so as to form spot images having an adequate diameter on an imaging surface.

We claim:

1. An imaging apparatus comprising: an imaging optical system which includes an optical low pass filter, and a solid-state image pickup device which is disposed so as to locate light receiving surface thereof at a location of an image of an object formed by said imaging optical system; wherein said optical low pass filter is composed of a diffractive optical element having a diffractive surface which is divided into a plurality of regions and disposed at a location of a pupil of said imaging optical system, and wherein said plurality of regions have imaging characteristics which vary in a discontinuous manner bordering on boundary lines of said regions, wherein said imaging optical system forms a point image which satisfies the following condition:

$$1/\Phi \leq 1.04(1/(n \cdot p_x)^2 + 1/(m \cdot p_y)^2)$$

wherein the reference symbol $\Phi$ represents a diameter of said point image, the reference symbols $p_x$ and $p_y$ designate pitches of picture elements disposed in the horizontal direction and the vertical direction respectively on said solid-state image pickup device, and the reference symbols n and m denote numbers of picture elements disposed in the horizontal direction and the vertical direction respectively on said solid-state image pickup device.

2. An imaging apparatus comprising: an imaging optical system which includes an optical low pass filter, and a solid-state image pickup device which is disposed so as to locate light receiving surface thereof at a location of an image of an object formed by said imaging optical system; wherein said optical low pass filter is composed of a diffractive optical element having a diffractive surface which is divided into a plurality of regions and disposed at a location of a pupil of said imaging optical system, and wherein said plurality of regions have imaging characteristics which vary in a discontinuous manner bordering on boundary lines of said regions, wherein said imaging optical system forms images of a point source as three point images which are located at vertices of a triangle and satisfy the following condition:

$$1.59 n \cdot p_x \leq L_1 \leq 1.90 \cdot p_y$$

wherein the reference symbol $L_1$ represents a distance between each two of the three images, the reference symbol $p_x$ designates a pitch of picture elements disposed in the horizontal direction on said solid-state image pickup device and the reference symbol n denotes a number of the picture elements disposed in the horizontal direction on said solid-state image pick device.

3. An imaging apparatus for endoscopes comprising: an imaging optical system for forming image of end surface of an image fiber and including an optical low pass filter, and a solid-state image pickup device disposed so as to locate a light receiving surface thereof at a position of the image formed by said imaging optical system; wherein said optical low pass filter has a diffractive surface which is divided into a plurality of regions and wherein said plurality of regions have imaging characteristics which vary in a discontinuous manner bordering on boundary lines of said regions, wherein said imaging optical system forms images of the end surface said image fiber as six separate images which are located at vertices of a hexagon and satisfy the following condition:

$$0.36 \, PF < a < 0.74 \, PF$$

wherein the reference symbol a represents a distance between each two of said six images and the reference symbol PF designates a distance between centers of two adjacent cores on said end surfaces of the optical image fibers.

4. An imaging apparatus for endoscopes comprising: an imaging optical system for forming image of end surface of an image fiber and including an optical low pass filter, and a solid-state image pickup device disposed so as to locate a light receiving surface thereof at a position of the image formed by said imaging optical system; wherein said optical low pass filter has a diffractive surface which is divided into a plurality of regions and wherein said plurality of regions have imaging characteristics which vary in a discontinuous manner bordering on boundary lines of said regions, wherein said imaging optical system forms images of a point source located on an optical axis so that a light intensity distribution of the images is approximated by the cylinder function.

5. An imaging apparatus for endoscopes according to claim 4 wherein the light intensity distribution of said spot images satisfies the following condition:

$$1/\phi \leq 2/PF$$

wherein the reference symbol $\phi$ represents a diameter of said spot images and the reference symbol PF designates a distance between centers of two adjacent cores on said image of the end surface of said optical image fiber.

6. An imaging apparatus for endoscopes according to claim 1, 2, 3, 4, or 5 wherein the diffractive surface of said optical low pass filter has regions each of which has a sectional shape substantially of the kinoform.

7. An imaging apparatus for endoscopes comprising: an imaging optical system for forming image of end surface of an image fiber and including an optical low pass filter, and a solid-state image pickup device disposed so as to locate a light receiving surface thereof at a position of the image formed by said imaging optical system; wherein said optical low pass filter has a diffractive surface which is divided into a plurality of regions and wherein said plurality of regions have imaging characteristics which vary in a discontinuous manner bordering on boundary lines of said regions, wherein said optical low pass filter has a diffractive surface which has a sectional shape substantially of the kinoform and wherein said optical low pass filter is blazed at a wavelength in the vicinity of a wavelength $\lambda_0$ at which flare F, as defined by the following formula, has a minimum value:

$$F = \int_{\lambda_1}^{\lambda_2} \left[ 1 - \mathrm{sinc}^2 \left\{ \pi \left( m - m_0 \frac{\lambda_0}{n'(\lambda_0) - n(\lambda_0)} \cdot \frac{n'(\lambda) - n(\lambda)}{\lambda} \right) \right\} \right] d\lambda$$

wherein the reference symbol $\lambda_0$ represents a wave-length at which a diffraction efficiency is 1, the reference symbol $\lambda$ designates a wavelength at which a diffraction efficiency of interest is to be determined, the reference symbol $n'(\lambda)$ denotes a refractive index of a medium located on the side of emergence of said diffractive optical element, the reference symbol $n(\lambda)$ denotes a refractive index, at the wavelength $\lambda$, of a medium located on the side of incidence of said diffractive optical element, the reference symbol $n_0$ represents a number of order at which the diffraction efficiency of interest is 1 and the reference symbol m designates a number of order at which the diffraction efficiency of interest is to be determined.

8. An imaging apparatus for endoscopes according to claim 1, 2, 3, 4, or 5 wherein said optical low pass filter has a plurality of diffractive surfaces including one which has an optical axis located on an optical axis of said imaging optical system and another which has an optical axis eccentric from the optical axis of said imaging optical system.

9. An imaging apparatus for endoscopes according to claim 3 wherein said optical low pass filter has a diffractive surface which is divided into a region occupying a quarter of the entire surface and six regions each occupying a section obtained by dividing the rest surface into six equal sections, wherein said region occupying the quarter of the entire surface has an optical axis located on an optical axis of said imaging optical system and wherein the six regions occupying said six equal sections have optical axes which are eccentric from the optical axis of said imaging optical system in directions different from one another.

10. An imaging apparatus for endoscopes according to claim 1, 2, 3, 4, or 5 wherein said optical low pass filter has a diffractive surface divided into a central region which has an optical axis eccentric from that of said imaging optical system and other regions which are located around said central region and have optical axes disposed on the optical axis of said imaging optical system.

11. An imaging apparatus for endoscopes according to claim 1, 2, 3, 4, or 5 wherein said optical low pass filter is divided into a diffractive surface and a lens, and wherein said diffractive surface is divided into regions which have optical axes located on an optical axis of said imaging optical system and other regions which have optical axes eccentric from the optical axis of said imaging optical system.

12. An imaging apparatus for endoscopes according to claim 1, 2, 3, 4, or 5 wherein the regions of said optical low pass filter have only a function to divide a pupil.

13. An imaging apparatus for endoscopes according to claim 8, wherein each of the diffractive optical elements formed as the regions of said optical low pass filter has a sectional shape similar to the kinoform.

14. An imaging apparatus for endoscopes according to claim 12 wherein said optical low pass filter has a diffractive surface which has a sectional shape substantially of the kinoform.

15. An imaging apparatus for endoscopes according to claim 1, 2, 3, 4, or 5, wherein the diffractive surface of said optical low pass filter has regions, each of which has a sectional shape substantially that of a kinoform.

16. An imaging apparatus for endoscopes according to claim 1, 2, 3, 4, or 5, wherein said regions of said optical low pass functions only to divide a pupil of said imaging apparatus.

17. An imaging apparatus for endoscopes according to claim 16, wherein said optical low pass filter has a diffractive surface having a section shape substantially that of a kinoform.

18. An imaging optical system for endoscopes comprising: an imaging optical system for forming image of end surface of an image fiber and including an optical low pass filter, and a solid-state image pickup device disposed so as to locate a light receiving surface thereof at a position of the image formed by said imaging optical system; wherein said optical low pass filter has a diffractive surface which is divided into a plurality of regions and wherein said plurality of regions have imaging characteristics which vary in a discontinuous manner bordering on boundary lines of said regions, wherein said optical low pass filter is disposed on an edge surface of said image fiber.

19. An imaging apparatus comprising: an imaging optical system which includes an optical low pass filter, and a solid-state image pickup device which is disposed so as to locate light receiving surface thereof at a location of an image of an object formed by said imaging optical system; wherein said optical low pass filter is composed of a diffractive optical element having a diffractive surface which is divided into a plurality of regions and disposed at a location of a pupil of said imaging optical system, and wherein said plurality of regions have imaging characteristics which vary in a discontinuous manner bordering on boundary lines of said regions, wherein said optical low pass filter has a plurality of diffractive surfaces including one which has an optical axis located on an optical axis of said imaging optical system and another which has an optical axis eccentric from the optical axis of said imaging optical system.

20. An imaging apparatus for endoscopes comprising: an imaging optical system for forming image o fend surface of an image fiber and including an optical low pass filter, and a solid-state image pickup device disposed so as to locate a light receiving surface thereof at a position of the image formed by said imaging optical system; wherein said optical low pass filter has a diffractive surface which is divided into a plurality of regions and wherein said plurality of regions have imaging characteristics which vary in a discontinuous manner bordering on boundary lines of said regions, wherein said optical low pass filter has a plurality of diffractive surfaces including one which has an optical axis located on an optical axis of said imaging optical system and another which has an optical axis eccentric from the optical axis of said imaging optical system.

21. An imaging apparatus for endoscopes comprising: an imaging optical system for forming image of end surface of an image fiber and including an optical low pass filter, and a solid-state image pickup device disposed so as to locate a light receiving surface thereof at a position of the image formed by said imaging optical system; wherein said optical low pass filter has a diffractive surface which is divided into a plurality of regions and wherein said plurality of regions have imaging characteristics which vary in a discontinuous manner bordering on boundary lines of said regions, and wherein said optical low pass filter has a diffractive surface which is divided into a region occupying a quarter of the entire surface and six regions each occupying a section obtained by dividing the rest surface into six equal sections, wherein said region occupying the quarter of the entire surface has an optical axis of said imaging optical system and wherein the six regions occupying said six equal sections have optical axes which are eccentric from the optical axis of said imaging optical system in directions different from one another.

22. An imaging apparatus comprising: an imaging optical system which includes an optical low pass filter, and a solid-state image pickup device which is disposed so as to locate light receiving surface thereof at a location of an image of an object formed by said imaging optical system; wherein said optical low pass filter is composed of a diffractive optical element having a diffractive surface which is divided into a plurality of regions and disposed at a location of a pupil of said imaging optical system, and wherein said plurality of regions have imaging characteristics which vary in a discontinuous manner bordering on boundary lines of said regions, wherein said optical low pass filter has a diffractive surface divided into a central region which has an optical axis eccentric from that of said imaging optical system and other regions which are located around said central region and have optical axes disposed on the optical axis of said imaging optical system.

23. An imaging apparatus for endoscopes comprising: an imaging optical system for forming image of end surface of an image fiber and including an optical low pass filter, and a solid-state image pickup device disposed so as to locate a light receiving surface thereof at a position of the image formed by said imaging optical system; wherein said optical low pass filter has a diffractive surface which is divided into a plurality of regions and wherein said plurality of regions have imaging characteristics which vary in a discontinuous manner bordering on boundary lines of said regions, wherein said optical low pass filter has a diffractive surface divided into a central region which has an optical axis eccentric from that of said imaging optical system and other regions which are located around said central region and have optical axes disposed on the optical axis of said imaging optical system.

24. An imaging apparatus comprising: an imaging optical system which includes an optical low pass filter, and a solid-state image pickup device which is disposed so as to locate light receiving surface thereof at a location of an image of an object formed by said imaging optical system; wherein said optical low pass filter is composed of a diffractive optical element having a diffractive surface which is divided into a plurality of regions and disposed at a location of a pupil of said imaging optical system, and wherein said plurality of regions have imaging characteristics which vary in a discontinuous manner bordering on boundary lines of said regions wherein said optical low pass filter is divided into a diffractive surface and a lens, and wherein said diffractive surface is divided into regions which have optical axes located on an optical axis of said imaging optical system and other regions which have optical axes eccentric from the optical axis of said imaging optical system.

25. An imaging apparatus comprising: an imaging optical system for forming image of end surface of an image fiber and including an optical low pass filter, and a solid-state image pickup device disposed so as to locate a light receiving surface thereof at a position of the image formed by said imaging optical system; wherein said optical low pass filter has a diffractive surface which is divided into a plurality of regions and wherein said plurality of regions have imaging characteristics which vary in a discontinuous manner bordering on boundary lines of said regions wherein said optical low pass filter is divided into a diffractive surface and a lens, and wherein said diffractive surface is divided into regions which have optical axes located on an optical axis of said imaging optical system and other regions which have optical axes eccentric from the optical axis of said imaging optical system.

* * * * *